US012743253B2

(12) United States Patent
Garcia Coello

(10) Patent No.: US 12,743,253 B2
(45) Date of Patent: Sep. 22, 2026

(54) QUANTUM RANDOM NUMBER GENERATOR

(71) Applicant: Crypta Labs Ltd, London (GB)

(72) Inventor: Jose Luis Garcia Coello, London (GB)

(73) Assignee: Crypta Labs Ltd, London (GB)

( * ) Notice: Subject to any disclaimer, the term of this patent is extended or adjusted under 35 U.S.C. 154(b) by 1118 days.

(21) Appl. No.: 17/774,252

(22) PCT Filed: Nov. 5, 2020

(86) PCT No.: PCT/GB2020/052802
§ 371 (c)(1),
(2) Date: May 4, 2022

(87) PCT Pub. No.: WO2021/090007
PCT Pub. Date: Jan. 4, 2021

(65) Prior Publication Data

US 2022/0391173 A1 Dec. 8, 2022

(30) Foreign Application Priority Data

Nov. 5, 2019 (GB) .................................... 1916075
Dec. 18, 2019 (GB) .................................... 1918750

(51) Int. Cl.
*G06F 7/58* (2006.01)

(52) U.S. Cl.
CPC .................................. *G06F 7/588* (2013.01)

(58) Field of Classification Search
CPC ...................................................... G06F 7/588
See application file for complete search history.

(56) References Cited

U.S. PATENT DOCUMENTS

2020/0304228 A1* 9/2020 Shamee .............. H04B 10/697

FOREIGN PATENT DOCUMENTS

| | | | |
|---|---|---|---|
| CN | 109918046 | A | 6/2019 |
| EP | 2940923 | A1 | 11/2015 |
| GB | 2560873 | A | 10/2018 |
| WO | 2016141192 | A1 | 9/2016 |
| WO | 2017019507 | A1 | 2/2017 |
| WO | 2017080860 | A1 | 5/2017 |
| WO | 2017193106 | A1 | 11/2017 |
| WO | 2018115804 | A1 | 6/2018 |

* cited by examiner

*Primary Examiner* — Carlo Waje
(74) *Attorney, Agent, or Firm* — Young Basile Hanlon & MacFarlane. P.C.

(57) ABSTRACT

A quantum random number generator is described. For example, a system for generating quantum random numbers is described. The system comprises at least one source of non-monochromatic radiation and one or more photon detector elements, each for converting received photons of the non-monochromatic light into a corresponding output value. The at least one source of non-monochromatic radiation is configured to illuminate the one or more photon detector elements such that non-monochromatic radiation from the at least one radiation source is incident on each of the one or more photon detector elements, whereby photons of the radiation are incident at random the one or more photon detector elements. The system further comprises means of converting output values generated from the incident non-monochromatic radiation by the one or more photon detector elements to random numbers each comprising quantum noise.

15 Claims, 4 Drawing Sheets

QUANTUM RANDOM NUMBER GENERATOR

CROSS REFERENCE TO RELATED APPLICATION(S)

This application claims priority to International Patent Application No. PCT/GB2020/052802, filed Nov. 5, 2020, Great Britain Patent Application Serial No. 1916075.3, filed Nov. 5, 2019, and Great Britain Patent Application Serial No. 1918750.9, filed Dec. 18, 2019, all of which are hereby incorporated by reference.

TECHNICAL FIELD

This invention relates to a system and method for generating quantum random numbers.

BACKGROUND

Random number generators are devices that produce a series of numbers that lack a predictable pattern. There are a number of areas for which random numbers play a crucial role, including games of chance, AI and cryptography. There are two fundamental bases for cryptography: the use of random numbers for creating encryption keys, and the encryption protocol used. If either is weak, the cryptographic security is vulnerable.

High quality random numbers are hard to produce. There are currently three methods of generating random numbers—pseudo-random number generators, physical (or 'true') random number generators and quantum random number generators.

Pseudo-Random Number Generators (PRNG), also known as a deterministic random bit generator, use an algorithm for generating a sequence of numbers which approximates the properties of random numbers. The PRNG generated sequence is not truly random because it is determined by an initial value known as the seed. Problems with deterministic generators include shorter than expected periods for seed states, lack of uniformity of distribution for large numbers, and correlation of successive values. This makes them vulnerable to direct cryptanalytic attacks, input-based attacks and state compromise extension attacks.

"True" Random Number Generators (TRNG) are based on 'random' physical phenomenon, for example a ring oscillator TRNG. TRNGs are still vulnerable to attacks such as external mechanical or electromagnetic influences. For low latency devices, a key issue is blocking in the random numbers due to a lack of change in the environmental input. Blocking results when the environmental input changes insufficiently between the production of two random numbers. As a result, in the case of non-cryptographic grade applications, the TRNG or PRNG may produce blocks of the same "random" number, and so these are not true random numbers. Alternatively, in cryptographic-grade applications, the TRNG or PRNG may not output any numbers due to the blocking, therefore halting the cryptographic process.

The only way to produce truly random numbers is by random phenomena governed by the laws of quantum mechanics—quantum random number generators.

However, development of quantum-based devices are associated with a host of difficulties. Many such devices are required to operate within a set of ideal conditions. These conditions can include very low temperatures, complete isolation from external environmental influences, minimal movement or vibration, and no ambient light, which may be unsuitable for the commercial setting. For example, there is a need for the generation of random numbers from a quantum origin that works at the range of temperatures where technology can be used globally (−60 degrees Celsius to +90 degrees Celsius).

A particular problem is that new Internet of Things (IoT) devices, like smart cars, are expected to be communicating every 10 seconds (10 Hz) with other vehicles or with infrastructure. This requires a high rate of random number generation. There are also issues with size and the power consumption of existing quantum-based devices.

Thus there is a need to develop a high performance quantum random number generator (QRNG) that can operate in a commercial setting and generate quantum random numbers (QRNs) at a high rate. Such a device also needs to be robust and inexpensive to produce so it can be broadly distributed. It also has to fit into the parent device or infrastructure without putting additional strain on the power source. Attempts have been made to provide solutions to these problems. However, these present solutions have various issues.

Some attempt to generate QRNs using the quantum properties of visible light. However, these attempts often use a complex scheme that it is unreliable for mass production and not able to produce the required bit rate of QRN generation.

Others use restrictions on the light for achieving QRN generation, which reduces the rate of QRN generation and increases costs.

Attempts have been made to improve these QRNGs. For example, in patent documents EP2940923, WO2017080860 and CN109918046 systems are provided that comprise a light source and a light detector comprising multiple light detector elements that are adapted so that the detector measures the number of photons (n) received by each light detector element in a time interval (t), which is then used to generate a corresponding random number (r). If the same number of photons is measured by different light detector elements, this will again be mapped to the same random number (a second instance of the same random number). If a different number of photons is measured by different light detector elements, this different number of photons is mapped to a different random number. Where n is the number of photons measured, t is the time of measurement, and r is the random value:

Light detector element 1: n1@t→r1

Light detector element 2: n1@t→r1

Light detector element 3: n2@t→r2

Because the direction of emission of photons by the light source is determined by random quantum mechanical effects, the light detector element that receives a given photon is also random. Therefore, it follows that the number of photons received by each light detector element is also a random number determined by random quantum mechanical effects. Other arrangements have been provided, such as that of WO2017193106, which use single photon detectors to generate random numbers.

However, such systems generally rely on counting photons and operating sensor arrays in the linear regime as well as using incident light on the light detector that is monochromatic. Restricting the arrangement to monochromatic light has a number of potential drawbacks such as reduced entropy of the light source, increased manufacturing cost and complexity, and increased product size. Further such a system requires a relatively long period of time to produce a large number of quantum random numbers. This is because the time in which the light detector measures the number of photons received (herein called the pre-set time, or the exposure time) must be long enough that all of the light detector elements receive a number of photons. This is because if a light detector element does not receive any photons, then this value will not be the result of a quantum random process, because technical noise will dominate any readings by the light detector element. This will not result in true quantum random numbers being generated.

Accordingly, there is still a need to provide a quantum random number generator having reduced complexity, which is still able to produce high quality random numbers quickly and efficiently.

The embodiments described below are not limited to implementations which solve any or all of the disadvantages of the known approaches described above.

SUMMARY

The inventors of the invention described herein have appreciated the need to improve upon the existing random number generators and accordingly have provided an invention, embodiments of which may have benefits including applicability to a large range of light sources, improved system entropy leading to increased rates of high quality random number generation, improved ease of manufacture, and a reduced need for precise calibration.

The system and method for generating quantum random numbers according to the invention is defined in the appended claims, to which reference is now directed. Preferred features are set out in the dependent claims.

According to a first aspect embodiments provide a system for generating random numbers. The system comprises at least one source of non-monochromatic radiation and one or more photon detector elements, each for converting received photons of the non-monochromatic light into a corresponding output value. The at least one source of non-monochromatic radiation is configured to illuminate the one or more photon detector elements such that non-monochromatic radiation from the at least one radiation source is incident on each of the one or more photon detector elements, whereby photons of the radiation are incident at random on (i.e. the radiation is incident on random ones of) the one or more photon detector elements. The system further comprises means of converting output values generated from the incident non-monochromatic radiation by the one or more photon detector elements to random numbers each comprising quantum noise. The output values may be voltage values. For example, each value that is generated for each of the one or more photon detector elements is an output value based upon any incident photons received by the respective photon detector element in a pre-set period of time. For example, each value may correspond to the cumulative energy of any incident photons received by the respective photon detector element within a pre-set period of time or a number of photons received by the respective photon detector element within a pre-set period of time. The means of converting the output values may be implemented by any suitable hardware and/or software components, for example by the one or more photon detector elements themselves or by a suitably programmed processor or a combination thereof.

Thus, random numbers are being generated using non-monochromatic radiation incident on each photon detector element. Here, monochromatic radiation may be visible light or other forms of radiation, such as ultraviolet or infrared, having only a single wavelength. Non-monochromatic radiation is thus any form of radiation (e.g. visible light, ultraviolet light, infrared light etc.) having more than a single wavelength—the radiation comprises photons having different energies. In the below “radiation” and “light” are used to mean any group of one or more photons of any energy and are used interchangeably. Use of a non-monochromatic source of radiation is advantageous as it allows broad spectrum light (radiation) sources to be used, such as simple white light sources. Such lights sources contain higher entropy than monochromatic light sources, which allows the system to obtain higher rates of random number generation. Further, these light sources are easier to source, easier to manufacture and are typically less complex and smaller in physical size than monochromatic light sources.

Optionally, the system is configured such that each photon detector element directly receives radiation having a wide range of wavelengths. For example, the wavelengths may range from 360 nm to 760 nm. For example, the radiation emitted from the radiation source may not have been filtered according to wavelength along the light path from the radiation source to the detector element, or the radiation has been filtered according to wavelength in such a way that a range of wavelengths emitted by the radiation source is nonetheless received by each photodetector element. For example, the system may be configured such that the non-monochromatic radiation from the at least one radiation source is incident directly on each of the one or more photon detector elements without passing through a filter. Alternatively, the non-monochromatic radiation may pass through a filter that filters some wavelengths of light from the radiation source, but not others. For example, this can include a white light source filter that only passes white light, a UV filter that does not pass UV light or an infrared filter that does not pass infrared light, provided a range of wavelengths from the radiation source are received by the detector elements. In some embodiments other optical components such as a diffuser element that does not filter wavelengths of light but instead improves uniformity of illumination on the detector elements may be used. Each detector is therefore directly receiving non-monochromatic radiation during operation. Further, each of the one or more light detectors may produce a separate random number comprising quantum noise. This allows the system to quickly and efficiently generate a large number of random numbers.

Alternatively or in addition, the at least one source for emitting photons may be a white light source. As discussed above, such light sources contain higher entropy than monochromatic light sources, which allows the system to obtain higher rates of random number generation. Further, these light sources are easier to source, easier to manufacture and are typically less complex and smaller in physical size than monochromatic light sources.

Alternatively or in addition, the at least one source for emitting non-monochromatic radiation may be configured relative to the one or more photon detector elements such that each of the one or more photon detector elements are illuminated with non-monochromatic light during a single exposure period. This ensures that each photon detector element generates random numbers from the incident non-monochromatic light.

Alternatively or in addition, the at least one source of non-monochromatic radiation and the one or more photon detector elements are arranged such that the one or more photon detector elements respond linearly to the received light. Operating the system in the linear regime may maximize the entropy ("the randomness") of the random numbers generated.

Alternatively or in addition, the one or more photon detector elements are comprised in an array. The one or more photon detector elements may be all of the photon detector elements comprised in the array, or a sub-set of the photon detector elements comprised in the array. Alternatively, or in addition, the at least one source of non-monochromatic radiation comprises one or more LEDs and/or the array is a CMOS sensor or a CCD sensor.

These features provide a compact and easy to manufacture setup that can generate a large number of random numbers efficiently. Such an arrangement of photon detector elements are also suitable for integration into a wide range of different technologies.

In one embodiment of this first aspect, the array is a camera sensor, and the at least one source of non-monochromatic radiation and the exposure time and ISO of the camera sensor are arranged such that the one or more photon detector elements respond linearly to received light. Optionally, the camera sensor is a camera of a mobile computing device, for example a smartphone, and the at least one source of non-monochromatic radiation may, in some embodiments be a flash of the mobile computing device. This provides the system as implemented in a commercial product such as a mobile phone.

Alternatively or in addition, the system may be configured so as to not count photons.

Alternatively or in addition, the means of converting output values may comprise a means of converting the generated output values into digital values, the digital values being used to generate random numbers. The one or more photon detector elements may be configured such that each generated output value corresponds to a number of photons received by the respective photon detector element. The system may be configured such that, in a single exposure period of the one or more photon detector elements, there are fewer unique digital values available than the number of photons received by at least one of the photon detector elements. The system may be configured to operate in this way by setting the intensity of the light source and/or the gain of the one or more photon detector elements. When configured in this way, the system may not count photons. This may be advantageous as in such a set-up the variance of the digital values generated by photon detector elements is lower than in an electron number mode set up to count photons (the variance increases with ISO). This means that a less stable, more variable light source can be used without producing unacceptable variation in the output digital values. This also may reduce the precision required in the positioning of the components of the system, which may improve ease of manufacture and reduce cost of manufacture, particularly for mass production. Thus, utilising detector elements that operate in electron number mode and adjusting the parameters of the system so that the number of available output digital values is less than the number of received photons (or produced electrons), may allow for a larger range of light sources to be used.

Alternatively or in addition, the one or more photon detector elements may be configured such that each generated output value corresponds to a cumulative energy of the photons received by the respective photon detector element. Here, the means of converting output value may be configured to perform a mapping in which a cumulative energy of the photons received by the respective photon detector element is mapped to a random number comprising quantum noise. This may be advantageous in certain cases because incident photon energies may have a significantly larger range of possible values compared to counting photon numbers, an inherently discrete quantity. In such cases, the generation of a larger number of unique quantum random numbers is possible compared to arrangements that rely on counting photon numbers to generate random numbers.

According to the aspect embodiments also provide a method of generating random numbers. The method comprises emitting photons from at least one source of non-monochromatic radiation such that non-monochromatic radiation from the at least one source of non-monochromatic radiation is incident on each of one or more of photon detector elements, each for converting received photons of the non-monochromatic radiation into a corresponding output value, whereby the non-monochromatic radiation is incident at random on—i.e. on random ones of—the one or more photon detector elements. The non-monochromatic light received at each of the one or more photon detector elements is converted into a corresponding output value. These output values of the one or more photon detector elements are converted to a value which is inherently random and thus comprising quantum noise. The output values may be voltage values.

Optionally, the non-monochromatic radiation from the at least one radiation source is incident directly on each of the one or more photon detector elements without passing through a filter.

Alternatively or in addition, each of the one or more photon detector elements produce a separate random number comprising quantum noise.

Alternatively or in addition, the at least one source of non-monochromatic radiation is a white light source.

Alternatively or in addition, the at least one source of non-monochromatic radiation is configured relative to the one or more photon detector elements such that each of the one or more photon detector elements are illuminated with non-monochromatic radiation during a single exposure period.

Alternatively or in addition, the at least one source of non-monochromatic radiation and the one or more photon detector elements are arranged such that the one or more photon detector elements respond linearly to the received radiation.

Alternatively or in addition, the one or more photon detector elements are comprised in an array. The one or more photon detector elements may be all of the photon detector elements comprised in the array, or may be a sub-set of the photon detector elements comprised in the array. Optionally, the at least one source of non-monochromatic radiation comprises one or more LEDs. Alternatively or in addition, the array is a CMOS sensor or a CCD sensor.

In one embodiment of the first aspect, the array is a camera sensor, and the method further comprises arranging the at least one source of non-monochromatic radiation and the exposure time and ISO of the camera sensor such that the one or more photon detector elements respond linearly to received radiation. Optionally, the camera sensor is a camera of a mobile computing device, such as a smartphone, and the at least one source of non-monochromatic radiation is a flash of the mobile computing device.

The advantages discussed above in relation to the system of the first aspect are equally applicable to the above method.

Alternatively or in addition, the method may not count photons.

Alternatively or in addition, the method may further comprise converting the generated output values into digital values, the digital values being used to generate random numbers. Each generated output value may correspond to a number of photons received by the respective photon detector element and wherein, in a single exposure period of the one or more photon detector elements, there are fewer unique digital values available than the number of photons received by at least one of the photon detector elements. The method may further comprise setting the intensity of the light source and/or the gain of the one or more photon detector elements.

Alternatively or in addition, each generated output value may correspond to a cumulative energy of the photons received by the respective photon detector element. The method may further comprise performing a mapping in which a cumulative energy of the photons received by the respective photon detector element is mapped to a random number comprising quantum noise.

A computer program according to the first aspect is provided that, when executed, causes the system of the first aspect to carry out the method of the first aspect.

A computer-readable medium according to the first aspect is provided, the computer-readable medium having stored upon it the computer program of the first aspect.

According to a second aspect embodiments provide a system for generating random numbers, the system comprising: at least one light source for emitting photons; one or more photon detector elements; means for generating a value for each of the one or more photon detector elements; means for selecting a first set of values comprising each of the values that are above a threshold value; and means for converting each value in the set of values into a random number comprising quantum noise. Each of the one or more photon detector elements are configured to receive incident photons, and the at least one light source is configured to illuminate the one or more photon detector elements. Photons from the at least one light source are incident at random on the one or more photon detector elements, and each of the one or more photon detector elements generates a value. Here, each value that is generated for each of the one or more photon detector elements is an output value based upon any incident photons received by the respective photon detector element in a pre-set period of time. For example, each value may correspond to the cumulative energy of any incident photons received by the respective photon detector element within a pre-set period of time or a number of photons received by the respective photon detector element within a pre-set period of time. If a detector element did not receive an incident photon—it is "dark" detector element—a baseline value may be generated, which may indicate that the cumulative energy of incident photons received by the respective photon detector element in the pre-set period of time is zero, or that the number of photons received by the respective photon detector element within the pre-set period of time is zero. The means for generating the value for each photon detector element may be implemented by any suitable hardware and/or software components, for example by the one or more photon detector elements themselves or by a suitably programmed processor or a combination thereof. Similarly, the means for selecting the first set of values and the means for converting each value in the set of values may be implemented by any suitable hardware and/or software components, for example by a suitably programmed processor.

The values corresponding to photon detector elements that did not receive an incident photon—as may happen, for example, when operating the system in the low-flux non-linear regime—will not contain any quantum randomness. Instead, values resulting from these photon detector elements will be dominated by technical noise of the detectors. As such, using these values will not produce true quantum random numbers. By taking a "mask" of only values that are above a threshold, only the values that correspond to photon detector elements that have received one or more incident photons in the pre-set period of time are used to generate quantum random numbers This means that it is not required to use a long pre-set time that would be needed to illuminate each of the photon detector elements with a received photon, as would be required to generate quantum random numbers if the mask was not used. Therefore, the pre-set period of time of embodiments of the second aspect can be reduced as compared to the pre-set period of time used in other prior methods, resulting in the production of quantum random numbers with a low latency.

As will be appreciated, increasing the speed by which random numbers can be generated is very beneficial in numerous fields, such as in cryptography and in relation to the Internet of Things. A further field whereby being able to more quickly generate quantum random numbers is advantageous is in the field of autonomous and connected vehicles, in which it is often required for multiple vehicles to frequently and securely communicate with one another, requiring the use of quantum random numbers generated with a low latency.

In addition to generating low latency quantum random numbers, embodiments of the second aspect may overcome the problem of blocking that is associated with prior art methods and devices. This is because, by taking a mask of only those values that are above a threshold, the effect of values that would lead to blocking due to a lack of environmental variation (e.g. due to multiple photon detector elements receiving no incident energy and therefore producing the same value) can be excluded from the set of resulting quantum random numbers. That is to say, only values that are the result of sufficient environmental variation are used to produce low latency quantum random numbers so as to avoid blocking.

Alternatively or in addition, each generated value may be a digital value. For example each generated value may corresponding to the cumulative energy of any incident photons received by the one or more photon detector elements within a pre-set period of time, may be a digital value.

Alternatively or in addition, the one or more photon detector elements may be configured to generate a voltage value corresponding to the received photons. For example, the voltage value may correspond to the cumulative energy of any incident photons received by the one or more photon detector elements within a pre-set period of time.

Alternatively or in addition, the means for generating a value may be configured to convert the voltage values generated by the one or more photon detector elements into digital values. Furthermore, the means for selecting a first set of values may be configured to select a first set of digital values comprising each of the digital values that are above a threshold value and the means for converting each value in the set of values into a random number may be configured to convert each digital value in the set of digital values into a random number comprising quantum noise.

Alternatively or in addition, the one or more photon detector elements may comprise a plurality of photon detector elements.

According to the second aspect, the threshold value may be set above baseline values generated for the one or more photon detector elements when no photons are detected by the one or more photon detector elements. A baseline value for a photon detector element may be the value generated for the photon detector element when no photons are detected by the photon detector element in a pre-set period of time, which indicates that the cumulative energy of incident photons received by the respective photon detector element in the pre-set period of time is zero, or that the number of photons received by the respective photon detector element within the pre-set period of time is zero. The threshold value may be set such that only the generated values that correspond to photon detector elements that have received one or more incident photons (in the pre-set period of time) are above the threshold. Only the first set of values may be used for generating the random numbers comprising quantum noise. The at least one light source and the photon detector elements may be configured such that only a subset of the photon detector elements are illuminated by a sufficient number of incident photons to cause the respective generated value to be above the threshold value. This may be achieved by setting one or more of the pre-set period of time, the intensity of the at least one light source, and the gain of the one or more photon detector elements. Alternatively or in addition, the at least one light source and the one or more photon detector elements may be configured such that the one or more photon detector elements are operating in the non-linear regime. In particular, the system may be configured such that each of the one or more photon detector elements are operating in the low flux non-linear regime. For example, when a photon detector element is operating in such a regime, the variance in the number of photons received by the photon detector element during a given period of operation—i.e. across multiple pre-set periods of time (exposure periods of the photon detector element)—may be greater than the mean number of photons received by the photon detector element during the period of operation (across the multiple pre-set periods of time). Here, the term "mean number of photons" is the sum of the number of photons received in each pre-set period of time divided by the number of pre-set periods of time being considered, and the "variance" takes its normal meaning, being a measure of the spread of individual values from the mean value. In the case of an array of photon detector elements, operating each element in the low-flux non-linear regime may mean that, in a single pre-set period of time, the variance in the number of photons received across each element of the array is greater than the mean number of photons received by the elements of the array. When it is stated that a photon has been "received" by a photon detector element, it is meant that the photon has been absorbed by the element and generated a corresponding electron—the received photon generates a corresponding "photoelectron". Thus, in the non-linear regime, the variance in the number of photoelectrons generated by each of the one or more photon detector elements across multiple pre-set periods of time may be greater than the mean number of photoelectrons generated by the photon detector element across the multiple pre-set periods of time. In some cases, the variation in the values generated by the photon detector elements—e.g. the values generated by the array after a period of time receiving photons—is greater than the mean of the generated values. In one example, variance in the generated values corresponding to the cumulative energy of any incident photons received by the one or more photon detector elements is greater than the mean of the generated values corresponding to the cumulative energy of any incident photons received by the one or more photon detector elements. When operating in this way, the system is operating in the low flux, non-linear regime. The systems described herein are able to operate in the non-linear regime, and hence operate with a very short pre-set period of time, or shutter speeds, relative to previous, known systems.

Alternatively or in addition, the at least one light source and the one or more photon detector elements may be configured to operate in the non-linear regime by adjusting any one or more of the pre-set period of time, the intensity of the at least one light source, and the gain of the plurality of photon detector elements. For example, the at least one light source and the one or more photon detector elements may be configured such that, for each of the one or more photon detector elements, the variance in the number of photons received (or photoelectrons generated) by the photon detector element across multiple pre-set periods of time is greater than the mean number of photons received (photoelectrons generated) by the photon detector element across the multiple pre-set periods of time by adjusting any one or more of the pre-set period of time, the intensity of the at least one light source, and the gain of the plurality of photon detector elements. In some cases, the at least one light source and the plurality of photon detector elements may be configured such that the variance in the generated values is greater than the mean of the generated values by adjusting any one or more of the pre-set period of time, the intensity of the at least one light source, and the gain of the plurality of photon detector elements.

Alternatively or in addition, the pre-set period of time may be less than or equal to 95 μs.

Alternatively or in addition, the plurality of photon detector elements may be arranged in an array of photon detector elements.

Alternatively or in addition, the system may also comprise a means for selecting a second set of values comprising each of the values that correspond to a specific set of the plurality of photon detector elements. Furthermore, the means for selecting a first set of values may be configured to select a first set of values from the second set of values, the first set of values comprising each of the values in the second set of values that are above a threshold value. This selection of the second set may take the form of a crop of values in which values corresponding to pixels in a central portion of the array are selected. This may improve the quality of the random numbers generated as only pixels that are uniformly illuminated are selected.

Alternatively or in addition, the specific set of the plurality of photon detector elements may comprise the central photon detector elements of the array of photon detector elements.

Alternatively or in addition, the one or more photon detector elements may be either a CCD sensor or a CMOS sensor.

Alternatively or in addition, the one or more photon detector elements may be incorporated into a digital camera.

Alternatively or in addition, the pre-set period of time may be determined by the shutter speed of the camera.

Alternatively or in addition, the means for selecting a second set of values comprising each of the values that correspond to a specific set of the plurality of photon detector elements may comprise a means for cropping the image captured by the camera.

Alternatively or in addition, each of the plurality of photon detector elements may produces a separate random number comprising quantum noise.

Alternatively or in addition, the at least one light source may be monochromatic.

Alternatively or in addition, the at least one light source may be non-monochromatic.

Alternatively or in addition, the at least one light source may be a white light source.

Alternatively or in addition, the at least one light source may be an LED.

Alternatively or in addition, the digital camera may be a digital camera of a mobile computing device.

Alternatively or in addition, the at least one light source may be a flash of the mobile computing device.

Alternatively or in addition, the mobile computing device may be a smartphone.

Alternatively or in addition, the system may further comprise an optical diffuser between the one or more light sources and the one or more photon detector elements.

A method of generating random numbers is also provided according to the second aspect, the method comprising: emitting, by at least one light source, photons such that one or more photon detector elements are illuminated; receiving, by the one or more photon detector elements, incident photons, wherein photons from the at least one light source are incident at random on the one or more photon detector elements; generating a value for each of the one or more photon detector elements; selecting a first set of values comprising each of the values that are above a threshold value; and converting each value in the set of values into a random number comprising quantum noise. Photons from the at least one light source are incident at random on the one or more photon detector elements, and are converted into a corresponding value. Here, each value that is generated may correspond to the cumulative energy of any incident photons received by the respective photon detector element within a pre-set period of time, or one or more photons received by the respective photon detector element within a pre-set period of time. A baseline value is generated for a "dark" detector element—a detector element that did not receive an incident photon.

Alternatively or in addition, each generated value may be a digital value. For example, each generated value corresponding to the cumulative energy of any incident photons received by the one or more photon detector elements within a pre-set period of time may be a digital value.

Alternatively or in addition, the method may further comprise the step of generating, by the one or more photon detector elements, a voltage value corresponding to the received photons. For example, the voltage value may correspond to cumulative energy of any incident photons received by the one or more photon detector elements within a pre-set period of time.

Alternatively or in addition, the step of generating a value may comprise converting the voltage values generated by the one or more photon detector elements into digital values. Furthermore, the step of selecting a first set of values may comprise selecting a first set of values comprising each of the digital values that are above a threshold value; and the step of converting each value in the set of values into a random number may comprise converting each digital value in the set of values into a random number comprising quantum noise.

Alternatively or in addition, the one or more photon detector elements that receive the incident photons may comprise a plurality of photon detector elements.

According to the second aspect, the threshold value may be set above baseline values generated for the one or more photon detector elements when no photons are detected by the one or more photon detector elements. A baseline value for a photon detector element may be the value generated for the photon detector element when no photons are detected by the photon detector element in a pre-set period of time, which indicates that the cumulative energy of incident photons received by the respective photon detector element in the pre-set period of time is zero, or that the number of photons received by the respective photon detector element within the pre-set period of time is zero. The threshold value may be set such that only the generated values that correspond to photon detector elements that have received one or more incident photons (in the pre-set period of time) are above the threshold. Only the first set of values may be used for generating the random numbers comprising quantum noise. The at least one light source and the photon detector elements may be configured such that only a subset of the photon detector elements are illuminated by a sufficient number of incident photons to cause the respective generated value to be above the threshold value. This may be achieved by setting one or more of the pre-set period of time, the intensity of the at least one light source, and the gain of the plurality of photon detector elements. Alternatively or in addition, the at least one light source and the plurality of photon detector elements may be configured to operate in the non-linear regime. For example, the at least one light source and the one or more photon detector elements may be configured such that the variance in the number of photons received (or photoelectrons generated) by each of the one or more photon detector elements across multiple pre-set periods of time may be greater than the mean number of photons received (photoelectrons generated) by the photon detector element across the multiple pre-set periods of time. In some cases, the variance in the generated values corresponding to the cumulative energy of any incident photons received by the one or more photon detector elements is greater than the mean of the generated values corresponding to the cumulative energy of any incident photons received by the one or more photon detector elements.

Alternatively or in addition, the at least one light source and the plurality of photon detector elements may be configured to operate in the non-linear regime by adjusting any one or more of the pre-set period of time, the intensity of the at least one light source, and the gain of the plurality of photon detector elements. For example, the at least one light source and the plurality of photon detector elements may be configured such that the variance in the number of photons received (or photoelectrons generated) by each of the one or more photon detector elements across multiple pre-set periods of time may be greater than the mean number of photons received (photoelectrons generated) by the photon detector element across the multiple pre-set periods of time. For example, the at least one light source and the plurality of photon detector elements may be configured such that the variance in the generated values corresponding to the cumulative energy of any incident photons received by the one or more photon detector elements is greater than the mean of the generated values corresponding to the cumulative energy of any incident photons received by the one or more photon detector elements by adjusting any one or more of the pre-set period of time, the intensity of the at least one light source, and the gain of the plurality of photon detector elements.

Alternatively or in addition, the pre-set period of time may be less than or equal to 95 μs.

Alternatively or in addition, the plurality of photon detector elements may be arranged in an array of photon detector elements.

Alternatively or in addition, the method may further comprises the step of selecting a second set of values comprising each of the values that correspond to a specific set of the plurality of photon detector elements; wherein the first set of values is selected from the second set of values.

Alternatively or in addition, the specific set of the plurality of photon detector elements may comprise the central photon detector elements of the array of photon detector elements.

Alternatively or in addition, the one or more photon detector elements may be either a CCD sensor or a CMOS sensor.

Alternatively or in addition, the one or more photon detector elements may be incorporated into a digital camera.

Alternatively or in addition, the pre-set period of time may be determined by the shutter speed of the camera.

Alternatively or in addition, the means for selecting a second set of values comprising each of the values that correspond to a specific set of the plurality of photon detector elements may comprise a means for cropping the image captured by the camera.

Alternatively or in addition, each of the plurality of photon detector elements may produces a separate random number comprising quantum noise.

Alternatively or in addition, the at least one light source may be monochromatic.

Alternatively or in addition, the at least one light source may be non-monochromatic.

Alternatively or in addition, the at least one light source may be a white light source.

Alternatively or in addition, the at least one light source may be an LED.

Alternatively or in addition, the digital camera may be a digital camera of a mobile computing device.

Alternatively or in addition, the at least one light source may be a flash of the mobile computing device.

Alternatively or in addition, the mobile computing device may be a smartphone.

Alternatively or in addition, photons incident on the one or more photon detector elements may pass through an optical diffuser between the one or more light sources and the one or more photon detector elements.

A computer program according to the second aspect is provided that, when executed, causes the system of the second aspect to carry out the method of the second aspect.

A computer-readable medium according to the second aspect is provided, the computer-readable medium having stored upon it the computer program of the second aspect.

The advantages discussed above in relation to the systems of the various aspects are equally applicable to the above methods.

BRIEF DESCRIPTION OF THE DRAWINGS

Embodiments of the invention will be described in more detail by way of example, with reference to the accompanying drawings, in which.

DETAILED DESCRIPTION

The present disclosure will discuss first two aspects of the invention. The first aspect will be discussed under the heading "Non-monochromatic light source" and the second under the heading "Non-linear regime". The disclosure will then turn discussion to the post-processing methodology that applies equally to both aspects under the heading "Post-processing".

Figure 1:
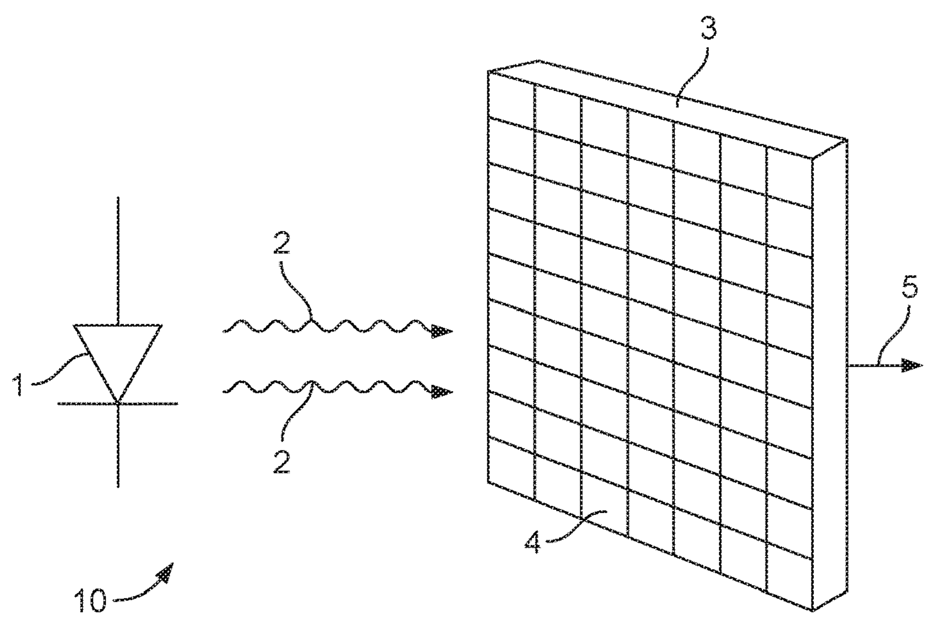
FIG. 1 is a schematic representation of a system for generating random numbers according to a first embodiment.

FIG. 1 shows a schematic representation of an exemplary system that comprises the main functional components for implementing the principles described herein. For ease of description, we will refer to this system as the "first embodiment". It will be appreciated, however, that the components of this embodiment, and the concepts described in relation to these components, may apply to all embodiments described herein, and particularly to both of the above described aspects. Where specific implementations are discussed, these apply the principles set out in relation to FIG. 1. It will be appreciated that any particular piece of hardware or software suitable for fulfilling the functions discussed in relation to FIG. 1 may be used. For the avoidance of doubt it will also be appreciated that, although the first aspect is discussed in relation to operation in the linear regime, the first aspect may be implemented in the non-linear regime in the manner set out according to the second aspect of the invention.

Non-Monochromatic Light Source

Figure 2:
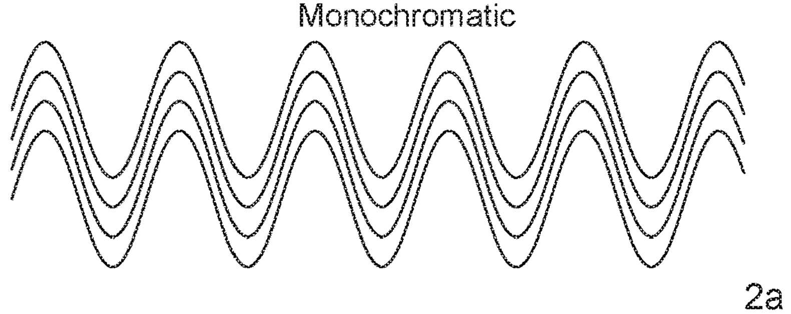
FIG. 2 is a graphical representation of the energy distribution of photons of monochromatic light shown in FIG. 2*a*, and non-monochromatic light shown in FIG. 2*b;*
Figure 2:
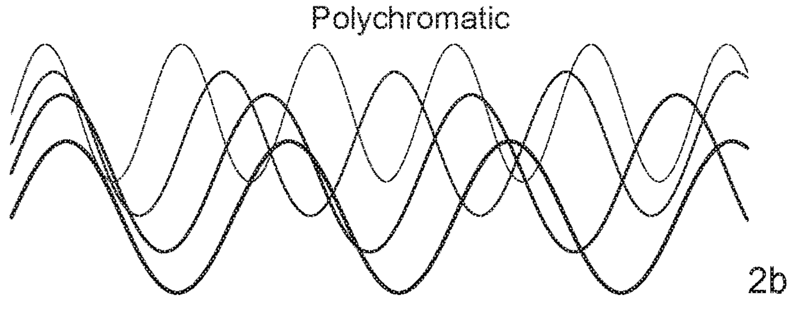
Figure 3:
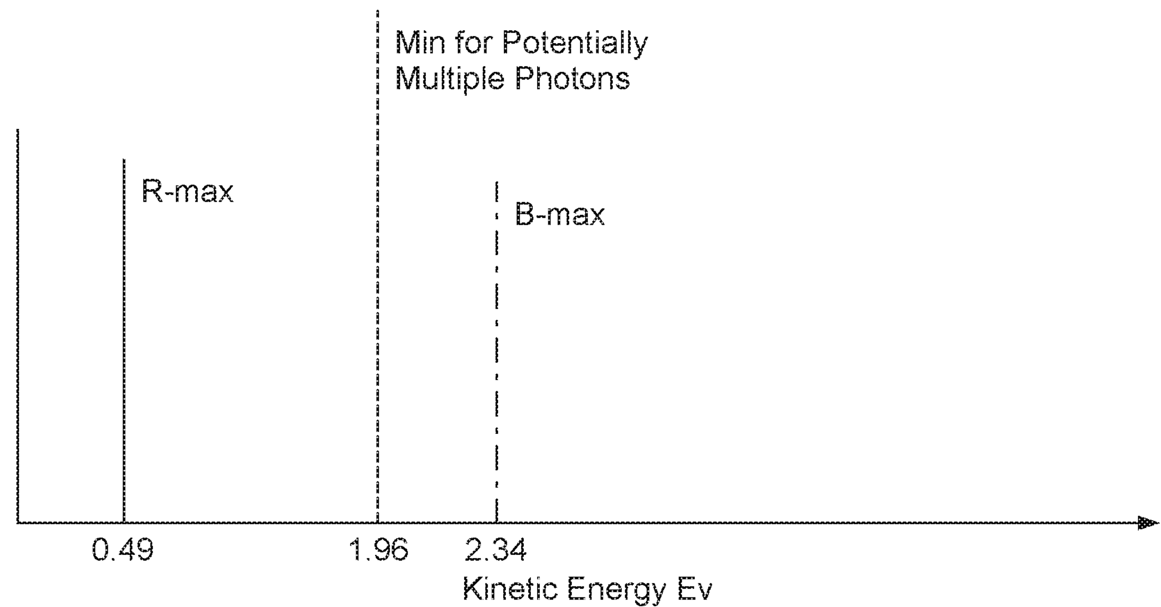
FIG. 3 is a graphical representation of a possible kinetic energy level for a red photon, R-max, and a possible kinetic energy level of a blue photon, B-max.

FIG. 1 illustrates an example quantum random number generating system 10 for implementing this first aspect. FIG. 2 is a graphical representation of the energy distribution of photons of monochromatic light shown in FIG. 2*a* ("Monochromatic"), and non-monochromatic light shown in FIG. 2*b* ("Polychromatic"). FIG. 3 is a graphical representation of a possible kinetic energy level for a red photon, R-max, and a possible kinetic energy level of a blue photon, B-max.

In FIG. 1, a source for emitting photons—i.e. any suitable light/radiation source—1 is arranged to emit light (radiation) 2 with a known intensity. The light 2 emitted by the light source 1 comprises photons. In the illustrated first embodiment the light source 1 is a non-monochromatic light source, in particular a white light emitting diode (LED) emitting non-monochromatic radiation 2 with a known controlled intensity. Here, the white light source 1 is configured to emit white light 2 comprising photons with a range of wavelengths. The spectrum of the light 2 the light source 1 is configured to emit ranges from photons with a wavelength of 360 nm to photons with a wavelength of 760 nm.

The light 2 emitted by the light source 1 is incident on one or more light detecting elements. The one or more light detecting elements is an array 3 of photo-detector elements 4. The light source 1 and the array 3 are arranged so that the different photo-detector elements 4 of the array 3 are substantially evenly illuminated spatially across the array by the light 2 emitted by the light source 1.

The mean rate at which the light source 1 emits photons corresponds to the light flux emitted by the light source 1, or in other words, the amount of illumination or amount of light energy it produces. For an LED this is generally dependent on the electrical current used to drive the LED. Further, the mean rate at which the array 3 receives photons corresponds to the light flux of the incident light received at the array 3. This received light flux is related to the emitted light flux by the geometry of the light source 1 and the array 3 and any optical components in the light path between them, and by any light losses along the light path between the light source 1 and the array 3.

The photo-detector elements 4 of the array 3 are arranged in relation to the light source 1 so that the elements are substantially evenly illuminated. This results in the mean rate at which each photo-detector element receives photons corresponding to the mean rate at which the array 3 receives photons multiplied by the proportion of the illuminated area of the array occupied by that photo-detector element 4. For arrays where the photo-detector elements 4 each have the same size and take up substantially all of the surface area of the array 3, the mean rate at which each of the photo-detector elements 4 of the array 3 receives photons corresponds to the mean rate at which the array 3 receives photons divided by the number of photo-detector elements 4 in the array 3.

However, the directions of emission of individual photons are random and uncorrelated. These directions of emission are the random result of quantum mechanical effects. This means that the particular photo-detector elements 4 of the array 3 that receives a given individual photon is also the random result of quantum mechanical effects. Accordingly, the voltage value produced by a photo-detector element after receiving a set of one or more photons, is a truly random, or quantum random, effect which cannot be predicted in any way.

In operation of the random number generating system 10, the light source 1 is driven to emit light with a selected light flux such that the photo-detector elements 4 of the array 3 are illuminated with a desired incident or received light intensity. The relationship between the light flux emitted by the light source 1 and the light intensity received at the array 3 will depend on the properties of the optical path between them, and the light detector arrangement being used. This is a known, fixed relationship.

The light source 1 is driven to emit light with a selected light flux by a controller of the random number generating system 10 driving the light source 1 with a corresponding drive voltage. The controller may be a microprocessor.

When the array 3 is illuminated by the light source 1, photons are absorbed by each photon detector element 4 and converted into electrical charge. The light source 1 and the array 3 are arranged so that each photon detector element of the one or more light detecting elements is illuminated in a given exposure period by a set of photons having a number of photons. The arrangement is such that each set of photons has a large number of photons, each photon having a wavelength ranging from 360 nm to 760 nm (i.e. the set of photons represents non-monochromatic light, here white light). Over a single exposure time period, each photon detector element 4, which absorbs a set of photons, generates a voltage value. Here, each photon detector element is directly receiving photons having a wide range of wavelengths (e.g. ranging from 360 nm to 760 nm). This is because the wavelengths of the light emitted from the light source have not been filtered along the light path from the light source to the detector element. In this embodiment, no filter is present. However, in other embodiments a white light source filter (i.e. a filter that passes white light) or a diffuser element (that does not filter wavelengths of light but instead improves uniformity of illumination on the detector elements), may be used, provided a range of wavelengths are directly received by the detector elements. In other embodiments, filters may be used that allow photons falling within a range of wavelengths to pass, but which filters out photons with wavelengths falling outside the range (e.g. a filter that allows infra-red light to pass, but filters out other wavelengths, or a filter that allows light to pass that is only in, for example, a range of 360 nm to 600 nm). In other words, embodiments may allow for any appropriate filtering to be performed on the light provided the arrangement is set up so that each detector element receives photons with a wide range of wavelengths, which are then utilised to generate quantum random numbers.

Voltage values corresponding to the received photons may be generated in more than one way depending on the type of photon detector elements used. For example, the one or more photon detector elements may be configured such that each generated voltage value corresponds to a number of photons received by the respective photon detector element. In such an example, each photon detector element may convert the number of received photons into a corresponding number of electrons—e.g. each photon absorbed by the detector element produces a corresponding "photoelectron"—and the total number of electrons produced at the end of the exposure period set for the detector element (the pre-set period of time) is measured to generate a voltage value. This method may be referred to as "electron number mode" herein and may be implemented by a CMOS, or CCD, sensor array of the type configured to operate according to this mode. Alternatively, the cumulative energy of the photons received by the photon detector element may be converted to a corresponding current value. Here, each photon absorbed by the detector element produces a corresponding "photoelectron" in the same manner as the electron number mode. However, in this second mode of operation it is the kinetic energy of the produced electrons, rather than their number, that is measured as a current value—which is then converted into a voltage value. This approach may be referred to as "electron current mode" herein and may be implemented by an appropriately configured sensor array, for example a current mode CMOS or CCD array. This first aspect may implement either mode as appropriate for a given use case as would be clear to the skilled person.

At the end of an exposure period—i.e. after a pre-set period of time—the array 3 converts the voltage value on each photo-detector element 4 to a corresponding digital value to generate a set of digital values. The voltage values may be converted into digital values by one or more analogue to digital converters of the array 3. If the arrangement is operating according to electron number mode, and the system is configured such that each additional photoelectron generated by a photon detector element results in a new digital value being generated—i.e. the change in the voltage value resulting from the addition of a single electron to the total number of electrons produced after the pre-set period of time is sufficient to generate a new digital value (in essence, that there are at least as many digital values available as generated electrons/received photons)—the system may be described as "counting photons". This is because a single photon may generate a single electron, which will in turn result in a unique digital output. Thus, it is possible to map the digital output to the number of photons received.

If, however, the arrangement is operating according to electron number mode, and the system is configured such that each additional photoelectron generated by a photon detector element does not necessarily result in a new digital value being generated, the system is not counting photons. In other words, the addition of a single photoelectron to the total number of photoelectrons produced after the pre-set period of time may not be sufficient to generate a new digital value. This may be the case when the number of possible digital values to which the photon numbers can be mapped is less than the number of photons received by the photon detector element. In such arrangements the digital value generated cannot be mapped to photoelectron number. This is because more than one photoelectron number may result in the same digital value being generated. Thus, different numbers of received photons may result in the same digital value being generated and so there is no mapping between photon number and output value.

The system can be configured so that it is, or is not, counting photons by adjusting the operating parameters of the system. In particular, this may be achieved by setting the ISO (or "gain"). If the ISO is set so that each additional photoelectron generated by a photon detector element results in a new digital value being generated, the arrangement can count photons. If the ISO is set such that each additional photoelectron generated by a photon detector element does not necessarily result in a new digital value being generated, the arrangement cannot count photons. Whether or not a particular ISO value results in the system being able to count photons can easily be determined, for example, by plotting the variance of the digital values generated by the photon detector elements against the mean of the digital values generated by the photon detector elements, and finding the gradient of the plot. If the gradient is greater than or equal to 1, the system can count photons. If the gradient is less than 1, the arrangement cannot count photons. The gradient increases with increasing ISO, and thus the gradient can be set by controlling the ISO. The gradient for a given ISO value can be calculated, for example, by varying the light intensity and the shutter speed for the given ISO value and calculating the relationship between the variance and the mean.

Thus the system may be configured so that it does not rely on counting photons in order to generate quantum random numbers. For example, the system may be configured to operate in electron number mode, but with the parameters of the system (e.g. the light intensity and ISO) set so that the system is not counting photons. This may be advantageous as in such a set-up the variance of the digital values generated by photon detector elements is lower than in an electron number mode set up to count photons (the variance increases with ISO). This means that a less stable, more variable light source can be used without producing unacceptable variation in the output digital values. For example, if the variation in the output values is too large, it may result in output values that are outside of the allowable range that can be processed by the system and may require other processing (e.g. clipping etc.) in order to be processed. This may introduce a bias into the system reducing randomness of the output. Thus, utilising detector elements that operate in electron number mode and adjusting the parameters of the system so that the number of available output digital values is less than the number of received photons (or produced electrons), may allow for a larger range of light sources to be used.

Alternatively, the system may be configured to operate in electron current mode, which does not rely on photon numbers to generate random numbers. If an arrangement is operating in "electron current mode", quantum random numbers are generated from a current value that is based on cumulative photon energy. In particular, the current value corresponds to the cumulative kinetic energy of the photoelectrons measured by the photon detector element, which in turn corresponds to the cumulative energy of the received photons. If the light source being used is monochromatic, or the light is being filtered into a very narrow wavelength band, then the arrangement may have the capacity to count photons. In such a case, each received photon has the same energy. Thus, the total cumulative energy, and the current value generated, is proportional to photon number (or number of generated photoelectrons) and a mapping can be performed between the digital value generated and the photon number. However, if the light source is non-monochromatic for electron current mode, photon number cannot generally be counted as number of photons is not necessarily proportional to cumulative energy. For example, a small number of short wavelength (high energy) photons may result in the same cumulative energy received by the detector as a large number of long wavelength (low energy) photons, or two groups of photons having the same photon number may result in different output values as they may have different cumulative energies.

Either way, according to electron current mode, quantum random numbers are generated from a current value that is based on cumulative photon energy. A generated digital value (and ultimately to output QRN) generated as a result of receiving a set of photons received by a photon detector element corresponds to the cumulative energy of those photons. A different cumulative energy value produced by a second set of photons results in a different QRN (provided the different cumulative energy value is sufficiently different to be resolvable by the system) regardless of whether the two sets of photons have the same number of photons. In other words, the mapping from received photons to QRNs is done on the basis of photon energy not photon number. This may be advantageous in certain cases because incident photon energies may have a significantly larger range of possible values compared to counting photon numbers, an inherently discrete quantity. This large range of values can be captured by adjusting the gain parameter of the system so that small fluctuations in the current can be resolved into unique digital values. This is particularly the case when a large range of photon wavelengths are incident directly on a given photon detector element. In such cases, the generation of a larger number of unique quantum random numbers is possible compared to arrangements that rely on counting photon numbers to generate random numbers.

It will be appreciated that this first aspect can make use of any one of the above discussed modes of operation and may operate by counting photons or not counting photons. It will be further appreciated that the embodiments discussed above that do not rely on counting photons have advantages that are not limited to the use of a non-monochromatic light source. Thus, these embodiments (e.g. electron number mode which does not count photons, and electron current mode) may be used in combination with a monochromatic light source and are not limited to systems utilising a non-monochromatic light source.

Accordingly, each value of the generated set of digital values is the random result of quantum mechanical effects. The voltage values produced by the set of photons received by each of the photo-detector elements 4 of the array 3 during an exposure time period contains both non-quantum technical noise from the system, and quantum noise (in other words, entropy having a quantum origin). Thus, the digital values generated from the voltage values are random numbers 5 comprising quantum noise. These random numbers 5 comprising quantum noise are referred to as raw quantum random numbers herein.

The number of photons contained in a given set of photons may range from anywhere between one photon and the number of photons that would saturate the photon detector, typically around 1200 photons/μm2. As explained in more detail below, keeping each detector element reasonably close to, but below, the saturation limit, whilst not essential, is desirable for optimal QRN generation.

Thus, embodiments can use a wide range of light sources, not just necessarily in the visible region but also Infrared or ultraviolet. Such lights sources contain higher entropy than monochromatic light sources, which allows the system to obtain higher rates of random number generation. Further, these light sources are easier to source, easier to manufacture and are typically less complex and smaller in physical size than monochromatic light sources.

In the illustrated first embodiment the array 3 is a CMOS camera sensor and the time period is the exposure time of a single picture frame or sensor readout operation taken by the CMOS camera sensor. Of course, it will be appreciated that other suitable hardware and/or software may be used, such as a CCD camera sensor, or any of the software of hardware discussed in relation to embodiments two, three or four).

The components of the embodiment of the invention could be integrated into existing commercial products such as mobile phones, PCs or laptops, or could form a standalone system on a chip (SoC) device.

Each time the CMOS camera sensor takes a single picture frame, or performs a sensor readout operation, the array 3 generates a set of N-bit integer digital values as an output, where N is the bit depth of the camera sensor, or in other words, the bit depth of each pixel of the camera sensor. The number of digital values in the set of digital values is equal to the number of photo-detector elements 4 in the array 3.

Accordingly, subject to the use of suitable operating parameters as discussed below, each time the CMOS camera sensor takes a single picture frame, or performs a sensor readout operation, the array 3 generates a set of raw quantum random numbers 5 as an output. The number of random numbers in the set of raw quantum random numbers 5 is equal to the number of photo-detector elements 4 in the array 3, that is, the number of pixels of the CMOS camera sensor. The pixel values of a raw image output from the CMOS camera sensor may be used as the set of raw quantum random numbers 5.

The set of raw random numbers 5 generated by the array 3 as an output will comprise a set of N-bit values, where N is the bit depth of the camera sensor. These raw random numbers 5 will be distributed about a mean value, with the distance of each raw random number value from the mean value being determined by random noise. For correct operating parameters, as discussed in more detail below, this random noise may be dominated by noise of quantum origin (i.e. photonic shot noise).

The set of raw random numbers 5 generated by the array 3 may be stored or output for subsequent use, or for further processing. In the illustrated embodiment the output set of raw random numbers 5 is stored in a buffer memory for subsequent processing by a post-processing system, as will be discussed in more detail below.

In operation, the light intensity incident on the array 3, the exposure time period and the sensor amplification applied to each photo-detector element 4 are set to values which maintain the photo-detector elements 4 in a linear response regime so that the charge generated by each photo-detector element 4 responds linearly to incident photons.

These parameters can be set to values such that the change in voltage value caused by a photo-detector element 4 receiving a photon having the lowest energy (longest wavelength) that can be generated by the light source 1 results in a change in the digital value output by that photo-detector element 4. It will be understood that in addition to the charge corresponding to incident photons, there will also be some fluctuation or noise having a non-quantum technical origin. This noise of non-quantum origin can be addressed by appropriate setting of parameters of the system. The exact nature of the parameters can be set as appropriate for a given use case, as would be clear to the skilled person.

When the parameter values are set correctly so that the photo-detector elements 4 are in a linear response regime, raw quantum random numbers can be produced because the elements are quantum noise dominated, i.e. the quantum random fluctuations in the number of photons received can be detected and converted into the raw quantum random numbers 5.

When the parameter values are set so that the photo-detector elements 4 receive too low a light intensity and are not in a linear response regime the technical noise of the sensor elements will dominate the output numbers.

When the parameter values are set incorrectly so that the photo-detector elements 4 receive too high a light intensity and are not in a linear response regime the sensor elements will saturate so that the output numbers so that these will not be dominated by quantum random noise.

In general, it is desirable to set the light intensity with which the photodetector elements 4 are illuminated as high as possible, subject to remaining within a linear response regime, in order to maximize the amount of quantum noise in the quantum random numbers output by the array 3 relative to the non-quantum technical or system noise.

In summary, the parameter values of the system may be set to ensure a) that the quantisation of the generated voltage values into digital values is appropriate and b) that the photon detector elements are maintained in the linear regime. This allows the system to generate a large number of unique random numbers that are dominated by quantum noise. These parameters may for example include the sensor amplification ("gain" or "ISO) and exposure time. The exposure time period and the sensor amplification correspond to the exposure time and ISO of the CMOS camera sensor, which may be readily controlled by the controller by using the normal control inputs of the CMOS camera sensor.

Accordingly, the photo-detector elements 4 can be maintained in a linear response regime by setting these parameters to appropriate values by the controller. In any specific implementation of the invention the necessary values can be determined in advance by suitable calculations and/or experimentation, and these values can be stored in, or provided to, the controller.

In some examples a self-testing algorithm or procedure may be used to determine and set the right parameters for use for the array 3 and light source 1 to generate raw random numbers 5 based on the results of test runs and/or measurements of system parameters and/or comparisons with intended baseline values. The self-testing algorithm or procedure may be carried out by the controller.

One appropriate method for determining suitable parameter values are detailed in relation to the fourth embodiment below, but it will appreciated that any suitable method may be used.

Accordingly, the random number generating system 10 can produce a set of raw quantum random numbers 5 after each image capture period or frame or sensor readout of the CMOS camera sensor, with each set of raw quantum random numbers 5 comprising a number of random numbers corresponding to the number of image pixels of the CMOS camera sensor, or to the number of image pixels used, which may be less than the total number of image pixels of the CMOS camera sensor. The set of raw quantum random numbers 5 may be read out serially or in parallel. The set of raw quantum random numbers 5 may be treated as a matrix of random numbers with matrix positions based on the pixel locations in the CMOS camera sensor generating each random number.

As is explained above, the raw quantum random numbers 5 contain quantum noise. In the illustrated example the raw quantum random numbers 5 are subjected to post-processing to generate pure quantum random numbers having one bit of quantum noise per bit The raw quantum random numbers 5 output from the random number generating system 10 are quantum random numbers containing quantum noise. However, because the raw quantum random numbers 5 have been generated based on the random number of photons received at different ones of the photo-detector elements 4, these raw quantum random numbers will be distributed about a mean value, with the distance of each raw quantum random number value from the mean value being determined by random noise. This mean value may be regarded as a bias in the raw quantum number values, with the value of the bias being determined by the operating parameters of the random number generating system. For correct operating parameters, as discussed in more detail below, the random noise may be dominated by noise of quantum origin (i.e., photonic shot noise). Generally, the raw quantum random numbers 5 will have a Poisson distribution about a bias value corresponding to the mean number of photons detected by all of the photo-detector elements 4 of the array 3. Further, because the raw quantum random numbers 5 inevitably include a mixture of bias, quantum noise and non-quantum system noise, the raw quantum random numbers 5 will have an entropy of less than 1, that is, less than one bit of entropy per bit. Further, the raw quantum random numbers will have a predetermined bit length set by the bit depth of each pixel of the sensor. The raw quantum random numbers generated by the array 3 as an output will comprise a set of N-bit values, where N is the bit depth of each pixel of the sensor.

In the example described above the source for emitting photons 1 is described as a white light source. However, it will be appreciated that other sources suitable for emitting photons may be used. For example, any non-monochromatic light source could be used, for example a light source that operates outside of the visible spectrum, such as an ultraviolet light source of an infrared light source. Alternatively, or in addition, a light source that is not white, but produces photons of varying wavelengths could be used. Alternatively, more than once light source could be used, for example a white light source could be used in combination with one or more or an ultraviolet and an infrared light source. The embodiments described above use one or more LEDs as a light source. In some examples one or more lasers may be used as the light source. In other examples other light sources may be used. This list is not intended to be exhaustive.

As will be appreciated, the ranges of the wavelengths of the photons emitted will depend on the light source(s) used. In the first embodiment, a white light source is used, corresponding to a range of photon wavelengths of 360 nm to 760 nm. However, this range could vary if a different source is used. For example, if an ultraviolet light source is used, the range of wavelengths would be between 10 nm and 400 nm. For infrared, this range would be 500 nm to 1 mm. An advantage of embodiments of the first aspect is that the system can generate high entropy random numbers from any range of wavelengths—embodiments are not limited to any particular range, and the specific range used will depend on the specific use case.

Figure 4:
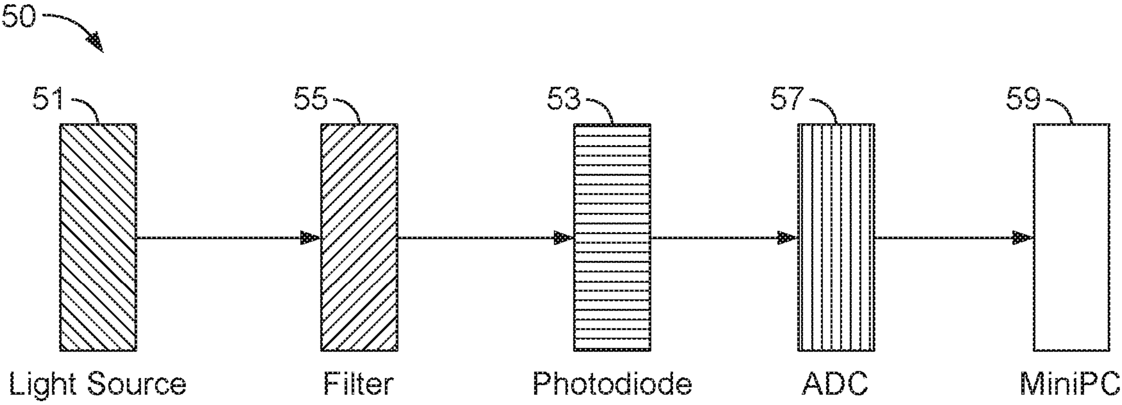
FIG. 4 is a schematic representation of a system for generating random numbers according to an alternative embodiment.

FIG. 4 illustrates a quantum random number generating system 50 according to a second embodiment of this first aspect.

An overview of the quantum random number generating system 50 according to the second embodiment is that the system operates in a similar manner to the first embodiment. The light source 51 is the same light source as that discussed in relation to the first embodiment—a single white light source. However, as discussed above, any other suitable light source, whether infrared, ultraviolet, etc., may be used. Alternatively, the system may comprise multiple light sources that may be a suitable combination of any of these types of light sources. Further, the post processing of the raw QRNs is the same as described above. This post processing is performed in a post-processing block, which may be implemented in hardware such as processor 59—e.g. a mini PC like a Raspberry Pi—or in software.

The second embodiment differs from the first embodiment in that it makes use of a combination of a filter 55, here a white light source filter, an ultrafast photodiode 53, and an ADC 57 to provide a single pixel camera arrangement that can generate QRNs. This arrangement may form a standalone device capable of generating random numbers, or may be integrated into commercial products in a similar manner to the first embodiment.

An example of a suitable white light source filter is a DURIS® S 8, GW P9LT101.CM white light source filter. An example of a suitable ultrafast photodiode is a photodetector in the UPD series of ultrafast photodetectors. An example of a suitable ADC is the Dual 1.5 GSps 12-Bit ADC & DAC WFMC+.

The filter 55 is used to illuminate the photodiode 53 at 55% of the maximum illumination of the diode 53. This level of illumination has been shown to provide good results whilst ensuring the photodiode 53 does not saturate, which would take the photodiode 53 out of the linear regime of operation.

The photodiode 53 converts a set of photons received during an exposure period into a voltage value, which is converted to a digital value by the ADC. This digital value is then saved in memory. Multiple outputs are measured and stored in memory. In this particular example, measurements are taken in groups of 16, with the 16 raw quantum random numbers stored in memory being aggregated and then subject to randomness extraction to produce a final output QRN. The randomness extraction post-processing is performed in the same manner as described in relation to the first embodiment. The aggregation of data after 16 measurements has been found to avoid overlaps between successive measurements and dark counts in which no photons are detected.

Figure 5:
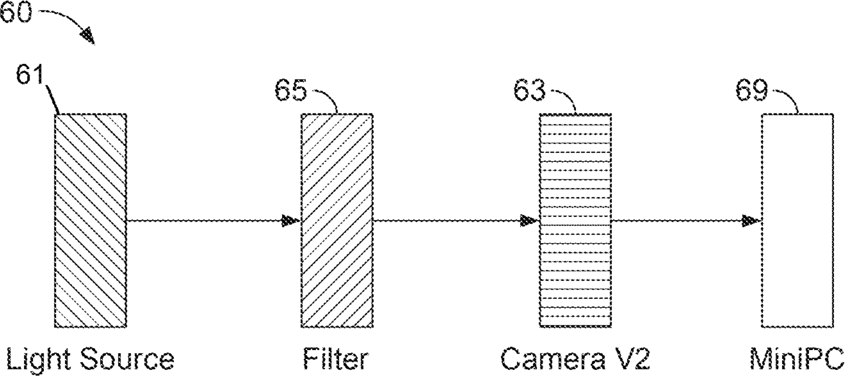
FIG. 5 is a schematic representation of a system for generating random numbers according to an alternative embodiment.

FIG. 5 illustrates a quantum random number generating system 60 according to a third embodiment of this first aspect.

The quantum random number generating system 60 according to the third embodiment operates in a similar manner to the first embodiment. The light source 61 may be the same light source as that discussed in relation to the first embodiment—a single white light source. As discussed above, any other suitable light source, whether monochromatic, infrared, ultraviolet, etc., may be used. Alternatively, the system may comprise multiple light sources that may be a suitable combination of any of these types of light sources. Further, as with the second embodiment, the post processing of the raw QRNs is performed in the same as described in relation to the first embodiment. This post processing is performed in a post processing block, which may be implemented in hardware such as processor 69—e.g. a mini PC like a Raspberry Pi—or in software The third embodiment differs from the previous embodiments in that it makes use of a combination of a filter 65, here a white light source filter, and a camera 63, such as a Camera V2 to provide an array of sensors on a printed circuit board (PCB) device that can generate QRNs. This arrangement may form a standalone device capable of generating random numbers, or may be integrated into commercial products in a similar manner to the first embodiment.

An example of a suitable white light source filter is a DURIS® S 8, GW P9LT101.CM white light source filter.

The camera 63 uses a back-illuminated sensor, such as a Sony IMX219 Sensor, in which metal wiring and transistors that have been removed from the optical path and placed on the reverse of the silicon substrate supporting the components of the sensor. This is in contrast to front-illuminated sensors in which the metal wiring and transistors are on the surface of the silicon substrate that form the sensor's light-sensitive area (photo-diode). The use of a back illuminated sensor reduces electronic noise.

The filter 65 is used to illuminate the photodetectors of camera 63 at 55% of the maximum illumination of the photodetectors. As with the third embodiment, this level of illumination has been shown to provide good results whilst ensuring the photodetectors of the camera 63 does not saturate, which would take the camera 63 out of the linear regime of operation.

The camera 63 captures a raw image in which the pixels of the image represent the raw quantum random numbers. These are saved in memory. The system then aggregates the data in groups of 16 adjacent pixels. Each group is then subject to randomness extraction to produce a final output QRN. The randomness extraction post-processing is performed in the same manner as described in relation to the first embodiment. The aggregation of data every 16 adjacent pixels has been found to avoid overlaps between successive measurements and dark counts in which no photons are detected.

As with the first and second embodiments, the third embodiment can form a standalone QRNG or can be integrated into any suitable commercial product such as a mobile phone, a PC or a laptop.

In a fourth embodiment, components of the invention described in relation to FIG. 1 are provided by the hardware and software present in a mobile phone. In this embodiment, a CMOS camera sensor of the Samsung Galaxy 57®—the Samsung S5K2L1 CMOS sensor—is paired with the Samsung Exynos 8690 SoC. Suitable data can be acquired using the Samsung Camera app, which provides a mode in which the capture settings such as gain (ISO), white balance, exposure time and focus can be appropriately adjusted as described in more detail below. It will be appreciated that other suitable hardware and/or software may be used, such as devices using a Sony IMX219 CMOS sensor, a Qualcomm Snapdragon 690 SoC, a V2 camera in combination with a mini PC similar to that discussed in relation to the fourth embodiment, or any suitable technology.

The light source may be a dedicated light source, or any environmental light source such as ambient light. The light source could even be the mobile phone's own flash function, with suitable means being used to direct the light from the flash component of the mobile phone to the photon detector elements. For example, a casing could be attached to the mobile phone and arranged to cover the mobile phone's flash and sensor components, and comprising mirrors to redirect the flash to the sensor. Here, photons falling within the wavelength range discussed in relation to the first embodiment (visible light) were considered.

As discussed in relation to the first embodiment, the parameters of the system are set so that the quantisation of the generated voltage values into digital values is appropriate and that the photon detector elements are maintained in the linear regime. The parameters that are optimised in relation to the present embodiment are set out in the following paragraphs.

The white level of the sensor is balanced over all pixels using the white balance setting.

Technical noise of the system may then be assessed, if needed, by capturing frames, or running sensor readouts, in the absence of any illumination. Data in these images arise from a variety of electronic noise sources, and for short integration times are expected to be dominated by "read out noise", arising in part from the amplification of the charge stored in the pixel prior to digitization.

This data can then be used to optimise integration time so that this noise is minimised. As discussed above, very short or long integration times should be avoided in order to maintain the detector elements in the linear regime. In this example, an interval of 1 ms-50 ms is suitable for low technical noise operation.

The camera sensor's ISO is then set so that the receipt of a single red photon results in a change in generated voltage that results in the digital output value being incremented by one. This may be done by illuminating the sensor with a light source based on a 625 nm (red) light emitting diode. The photons emitted from this device have been verified to obey Poisson statistics, and consequently it can be anticipated that the number of photons absorbed by each pixel in a given integration time to be Poisson distributed, with variance equal to the mean and a Fano factor of 1.

Raw images are captured for the full range of camera gain (ISO) settings, and the statistics of the pixel values are computed. To minimize any impact of electronic noise, we use integration times in the interval between 1:50 ms. To reduce random error, ten frames are captured for each gain setting and their pixels are combined. From this, it is determined that the optimal gain setting for this embodiment is ISO 320. At this level of amplification the influence of individual photoelectrons causes an increase in the observed digital output of at least one, with photonic shot noise dominating the observed statistics.

As discussed above, it is normally preferable to ensure the optical signal remains within the sensor's linear regime, i.e. the intensities at which the Fano factor remains approximately constant. To determine whether a light detector is operating in the linear regime, the sensor is illuminated with light and the output of the detector is measured as the intensity of light is varied. The camera gain is maintained at the optimal value of ISO 320 and integration times are maintained in the range of 1-50 ms.

The linear regime is observed between mean analogue to digital unit (ADU) values of approximately 140 and 910, corresponding to around 75% of the available ADU range.

With these parameters set, the system operates in the same manner as described in relation to the first embodiment in order to generate quantum random numbers.

Non-Linear Regime

FIG. 1 illustrates an example quantum random number generating system 10 for implementing the second aspect of the disclosure.

As discussed in relation to the first aspect, in FIG. 1, a source for emitting photons—i.e. any suitable light/radiation source—1 is arranged to emit photons 2. For example, the light source 1 may be an LED. The photons 2 emitted by the light source 1 are incident on one or more photon detecting elements 4. In this embodiment, the one or more photon detecting elements 4 are arranged in an array 3 of photon detector elements 4, though it will be appreciated that other numbers of photon detecting elements 4 or other arrangements of photon detecting elements 4 could be used. The light source 1 and the array 3 are arranged so that the photons 2 are incident at random on the array 3 of photon detector elements 4.

The mean rate at which the light source 1 emits photons 2 corresponds to the light flux emitted by the light source 1, or in other words, the amount of illumination or amount of light energy it produces, and for an LED this is generally dependent on the electrical current used to drive the LED. Further, the mean rate at which the array 3 receives photons 2 corresponds to the light flux of the incident light received at the array 3. This received light flux is related to the emitted light flux by the geometry of the light source 1 and the array 3 and any optical components in the light path between them, and by any light losses along the light path between the light source 1 and the array 3.

The photon detector elements 4 of the array 3 are arranged in relation to the light source 1 so that the photons 2 are incident at random on the photon detector elements 4. This results in the mean rate at which each photon detector element 4 detects photons 2 corresponding to the mean rate at which the array 3 receives photons 2 multiplied by the proportion of the illuminated area of the array occupied by that photon detector element 4. For arrays where the photon detector elements 4 each have the same size and take up substantially all of the surface area of the array 3, the mean rate at which each of the photon detector elements 4 of the array 3 receives photons 2 corresponds to the mean rate at which the array 3 receives photons 2 divided by the number of photon detector elements 4 in the array 3.

The random number generating system 10 also comprises a means for generating a value for each photon detector element 4 in the array 3. Each value may be generated from electrical charge measured by the photon detector element and is based upon received photons. As discussed in relation to the first aspect of the invention, the generated values may be generated according to an "electron current mode" in which the generated value corresponds to the total cumulative energy of all of the incident photons 2 received by the photon detector element 4 within a pre-set period of time, or, alternatively, an "electron number mode" in which the generated value may correspond to a number of photons received by the photon detector element within a pre-set period of time. In the "electron current mode", the generated value corresponds to the total cumulative energy of all of the incident photons 2 received by the photon detector element 4 within a pre-set period of time—more specifically to the cumulative kinetic energy of all photoelectrons produced by the received photons in the pre-set period of time. The pre-set period of time is the exposure period for the one or more detector elements. The value may be generated by the photon detector elements 4 themselves, or by another component, such as a microcontroller or microprocessor. In some embodiments, the value is a voltage value. In some embodiments, the value may be a digital value.

The directions of emission of individual photons 2 are random and uncorrelated. These directions of emission are the random result of quantum mechanical effects. This means that the particular photon detector elements 4 of the array 3 that receives a given individual photon 2 is also the random result of quantum mechanical effects. Accordingly, the value generated corresponding to each photon detector element 4 after receiving one or more photons 2 in a pre-set period of time is a truly random, or quantum random, effect which cannot be predicted in any way.

During operation of the random number generating system 10, the light source 1 is driven to emit light with a selected light flux such that the photon detector elements 4 of the array 3 are illuminated with a desired incident or received light intensity. The relationship between the light flux emitted by the light source 1 and the light intensity received at the array 3 will depend on the properties of the optical path between them, and the light detector arrangement being used. This is a known, fixed relationship.

The light source 1 is driven to emit light with a selected light flux by a controller of the random number generating system 10 driving the light source 1 with a corresponding drive voltage. The controller may be a microprocessor.

In the present embodiment, when the array 3 is illuminated by the light source 1, photons 2 are absorbed by each photon detector element 4 and converted into electrical charge. The light source 1 and the array 3 are arranged so that some of the photon detector elements 4 of the array 3 receive one or more photons 2 in a pre-set period of time. That is, some, but not necessarily all, of the photon detecting elements 4 have a number of photons 2 incident upon them. Different photon detecting elements 4 may have different numbers of photons 2 incident upon them. This number is limited by the pre-set period of time and the flux of photons 2 emitted by the light source 1. A longer pre-set period of time will, on average, increase the number of photons 2 received by a photon detector element 4, while a shorter pre-set period of time will, on average, decrease the number of photons 2 received by a photon detector element 4. Similarly, a higher flux of photons 2 from the light source 1 will, on average, increase the number of photons 2 received by a photon detector element 4, while a lower flux of photons 2 from the light source 1 will, on average, decrease the number of photons 2 received by a photon detector element 4.

As previously explained, over a single pre-set period of time, a value is generated in respect of each photon detector element 4. In the present embodiment, the values correspond to the cumulative energy of the photons received by (or the cumulative kinetic energy of the photoelectron generated by) each photon detector element 4 within the pre-set period of time, but this is not essential and may, for example, alternatively correspond to a number of photons received by each photon detector element. In any case if no photons are received by a photon detector element (it is a "dark" element), a baseline value is produced by the element representing that the cumulative energy (or the number of incident photons) is zero for the dark element. In the present embodiment, this value is a voltage value, which is then converted into a digital value as discussed below.

At the end of the pre-set period of time, a first set of values, here a set of digital values, is selected comprising each of the values that are above a threshold value. That is to say, a microprocessor, for example, may select each of the values corresponding to the cumulative energy of photons received by the photon detector elements 4 that are above a threshold value to create a first set of values.

The threshold value may be set such that values above the threshold are the result of one or more incident photons 2 being received by a photon detector element 4. Accordingly, the threshold may be set using a calibration process by which a first image is captured when the array 3 of photon detector elements 4 is not illuminated by any photons 2 from the light source 1. That is, a "dark" image is captured. This provides a baseline level for the values, taking into account effects such as technical noise in the detector. The threshold may be set such that it is above each of the values that are generated corresponding to the dark image in order to ensure that only values that correspond to a photon 2 being received will be above the threshold. The baseline value generated by a photon detector element "in the dark"—i.e. when no photon has been detected by the element—may be zero, or may be greater than zero due to system noise. The calibration process determines the baseline value for the system and sets the threshold accordingly.

In some embodiments, the values generated by each photon detector in the dark image may have a statistical distribution. This distribution may be measured, and the threshold value may be set such that there is a given probability that a photon detector element that generates a value equal to the threshold value has received an incident photon. For example, the threshold value may be set such that there is a 99% likelihood that a photon detector element that generates the threshold value has received a photon, though other values could be used. For example, the threshold value may be set such that there is a 95% likelihood or a 99.9% likelihood. A higher threshold will produce higher quality quantum random numbers, but may produce fewer quantum random numbers from each image.

In some embodiments, a second image may be captured. This time the array 3 may be illuminated by the light source 1, and so values generated will not correspond to "dark" photon detector elements 4 that receive no incident photons 2, but instead to "light" photon detector elements 4 that have received incident photons 2. The threshold may be set such that it is between the values generated corresponding to the "dark" photon detector elements 4 and the "light" photon detector elements 4.

While a method of calibration for determining an appropriate threshold has been described, it will be appreciated that other methods may be used. In some embodiments, the threshold may be set using theoretical calculations, while in others it may be set based upon experimentation. It is understood that different threshold values may be set according to the embodiment used and the operational requirements of the system in a given scenario.

In some embodiment, the values that are compared to the threshold may be voltage values. In this case, the first set may be a set of voltage values above a threshold voltage value. Alternatively, as is described above, the voltage values generated by the detector elements may be converted into digital values, and the digital values that are above a threshold digital value may be selected for the first set of values—here, the first set of values may be a first set of digital values.

For example, the array 3 may convert the voltage value corresponding to each photon detector element 4 to a corresponding digital value to generate a set of digital values. The voltage values may be converted into digital values by one or more analogue to digital converters of the array 3. The digital values above a threshold may then be selected to for a first set of digital values.

Accordingly, each value in the set of values (or set of digital values depending upon the embodiment) is the random result of quantum mechanical effects. The values generated contain both non-quantum technical noise from the system, and quantum noise (in other words, entropy having a quantum origin). Thus, the values in the set of values are random numbers 5 comprising quantum noise. These random numbers 5 comprising quantum noise are referred to as raw quantum random numbers herein.

By selecting only values that are above a threshold for the first set of values, and using only these values as the raw quantum numbers, it is possible to generate output quantum numbers (in accordance with the methods discussed below) using a relatively short pre-set period of time.

As previously discussed, in prior quantum random number generating systems, the array of photon detector elements must be exposed for a long enough period of time, with a sufficient flux of photons, such that each photon detector element receives incident photons. If the period of time during which the photon detector elements are receiving photons is too short and the photon flux is too low, then some photon detector elements will not receive any, or very few, photons. In this case, the detector elements can be described as operating in the low flux non-linear regime. As such, the photon detector elements that register no incident photons—no energy received from incident photons—or will receive too few incident photons, will lead to a (voltage) value being generated in respect of each of these photon detector elements that is dominated by technical noise. This will prevent truly random numbers from being generated.

However, according to the present aspect, only the values above a threshold, which correspond to those photon detector elements 4 that receive a number of incident photons 2 (e.g. one or more photons), or an amount of cumulative energy from incident photons 2, are selected to give raw quantum random numbers, which can then be operated on to obtain output quantum random numbers, in accordance with the methods discussed elsewhere in this application. This means that a short exposure period, or short pre-set period of time, in combination with a low photon flux, can be used while still producing true quantum random numbers. This can lead to a higher rate of quantum random number generation. It should be understood that by "short" periods of time, and "low" photon flux, in the present context, it is meant that not all of the photon detector elements 4 in the array 3 are illuminated by any incident photons 2, or that not all of the photon detector elements 4 in the array 3 are illuminated by enough incident photons 2 such that the respective generated value is above the threshold. In other words, according to this aspect of the invention, the light source and the photon detector elements can be configured so that each photon detector element in the array of photon detector elements operates in the low-flux non-linear regime—for example, a regime in which not all detector elements of the array receive incident photons—whilst still outputting true quantum random numbers. When the array of photon detector elements is in the non-linear regime, each photon detector element is operating in a regime in which the variance in the values generated by the element across a period of time—i.e. across multiple image frames (sensor readout) or pre-set periods of time—is greater than the mean value generated by the element across the period of time. This also means that, for the array as a whole in the non-linear regime, the variance in the values generated across the elements of the array in a single pre-set period of time is greater than the mean value generated for the array in the pre-set period of time. By configuring the light source and the photon detector elements to operate in the non-linear regime and then selecting only the values that are above the threshold—i.e. the values corresponding to those detector elements of the array that have received photons—and disregarding the values below the threshold—the values corresponding to "dark" detector elements—the system is able to operate in the non-linear regime whilst still outputting true quantum random numbers. As discussed elsewhere, the light source and the photon detector elements can be configured to operate in the low-flux non-linear regime by adjusting any one or more of the pre-set period of time, the intensity of the at least one light source, and the gain of the plurality of photon detector elements.

As previously discussed, the threshold can be set so that any energy received by a photon detector element 4 would give rise to a generated value that was above the threshold. However, photon detector elements 4 can "bleed" energy, so that when a given photon detector element 4 receives a photon 2, one or more of the photon detector elements 4 adjacent to the receiving photon detector element 4 may also record some energy. This phenomenon is known as "cross-talk". This can lead to a correlation between the values generated corresponding to the energy received by each photon detector element 4. However, setting a suitably high threshold can reduce the impact of cross-talk by not including the values associated with photon detector elements only illuminated by cross-talk from the first set of values, which subsequently is used to provide the raw quantum random numbers.

Additionally, in some embodiments, only every other photon detector element 4 in the array 3 may have its value considered for inclusion in the first set of values. This can also assist in reducing the effect of cross-talk.

The invention can use a wide range of light sources. The light source may be monochromatic, in which each photon 2 has the same energy and so the cumulative energy received by a photon detector element 4 corresponds to the number of photons 2 incident upon the photon detector element 4. Alternatively, the light source may be non-monochromatic. In this case, photons 2 may be incident upon the array 3 with different energies, and the cumulative energy received by a photon detector element 4 does not necessarily correspond to the number of photons 2 incident upon the photon detector element 4. A non-monochromatic light source may be white light, but may also not just be in the visible region but also Infrared or ultraviolet, for example. Such lights sources contain higher entropy than monochromatic light sources, which allows the system to obtain higher rates of random number generation. Further, these light sources are easier to source, easier to manufacture and are typically less complex and smaller in physical size than monochromatic light sources. In some embodiments, the light source may be an LED.

Alternatively, or in addition, a light source that is not white, but produces photons of varying wavelengths could be used. Alternatively, more than once light source could be used, for example a white light source could be used in combination with one or more or an ultraviolet and an infrared light source. The embodiments described above use one or more LEDs as a light source. In some examples one or more lasers may be used as the light source. In other examples other light sources may be used. This list is not intended to be exhaustive.

As will be appreciated, the ranges of the wavelengths of the photons emitted will depend on the light source(s) used. For example, in some embodiments, a white light source may be used, corresponding to a range of photon wavelengths of 360 nm to 760 nm. However, this range could vary if a different source is used. For example, if an ultraviolet light source is used, the range of wavelengths would be between 10 nm and 360 nm. For infrared, this range would be 760 nm to 1 mm. It will be appreciated that any combination of wavelengths could be used. An advantage of the present invention is that the system can generate high entropy random numbers from any range of wavelengths—the invention is not limited to any particular range, and the specific range used will depend on the specific use case.

In the illustrated first embodiment of this aspect the array 3 is a CMOS camera sensor and the pre-set period of time is the exposure time of a single picture frame or sensor readout taken by the CMOS camera sensor. Of course, it will be appreciated that other suitable hardware and/or software may be used, such as a CCD camera sensor, or any of the software of hardware discussed in relation to embodiments two, three or four).

The components of the embodiment of the invention could be integrated into existing commercial products such as mobile phones, PCs or laptops, or could form a standalone system on a chip (SoC) device.

Each time the CMOS camera sensor takes a single picture frame (or performs a single readout operation) the array 3 generates a set of N-bit integer digital values as an output, where N is the bit depth of the camera sensor, or in other words, the bit depth of each pixel of the camera sensor. The number of digital values in the set of digital values is equal to the number of photon detector elements 4 in the array 3.

Accordingly, subject to the use of suitable operating parameters as discussed below, each time the CMOS camera sensor takes a single picture frame (or performs a single readout operation) the array 3 generates a set of raw quantum random numbers 5 as an output. The number of random numbers in the set of raw quantum random numbers 5 is equal to the number of values in the set of values, which, in the illustrated embodiment, is equal to the number of photon detector elements 4 in the array 3 for which a value is generated that is above a threshold.

The pixel values of a raw image output from the CMOS camera sensor may be used as the values that are selected to be in the set of values, which can then be used as the raw quantum random numbers 5.

The set of raw random numbers 5 generated by the array 3 as an output will comprise a set of N-bit values, where N is the bit depth of the camera sensor. These raw random numbers 5 will be distributed about a mean value, with the distance of each raw random number value from the mean value being determined by random noise. For correct operating parameters, as discussed in more detail below, this random noise may be dominated by noise of quantum origin (i.e. photonic shot noise).

The set of raw random numbers 5 generated by the array 3 may be stored or output for subsequent use, or for further processing. In the illustrated embodiment the output set of raw random numbers 5 is stored in a buffer memory for subsequent processing by a post-processing system, as will be discussed in more detail below.

In operation, the higher the light intensity incident on the array 3, the more photon detector elements 4 will have received enough incident energy from the photons 2 to give values that are above the threshold, which will lead to more quantum random numbers being generated. As such, a higher intensity light source 1 is preferred. However, it is noted that the intensity of the light, along with the photon flux and pre-set period of time should be chosen so that the photon detector elements 4 do not become saturated.

The intensity of the light source and the gain of the photon detector elements can be set to values such that the change in voltage value caused by a photon detector element 4 receiving a photon having the lowest energy (longest wavelength) that can be generated by the light source 1 results in a change in the digital value output by that photon detector element 4. It will be understood that in addition to the charge corresponding to incident photons, there will also be some fluctuation or noise having a non-quantum technical origin. This noise of non-quantum origin can be addressed by appropriate setting of parameters of the system, as discussed previously. The exact nature of the parameters can be set as appropriate for a given use case, as would be clear to the skilled person.

In some examples a self-testing algorithm or procedure may be used to determine and set the right parameters for use for the array 3 and light source 1 to generate raw random numbers 5 based on the results of test runs and/or measurements of system parameters and/or comparisons with intended baseline values. The self-testing algorithm or procedure may be carried out by the controller.

Figure 6:
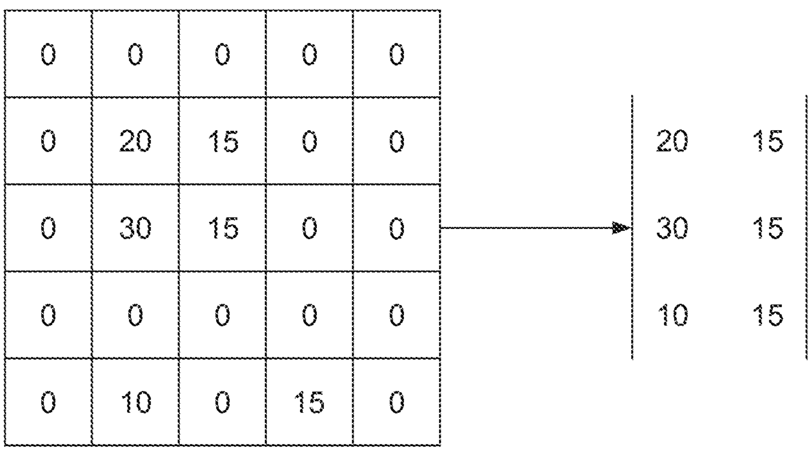
FIG. 6 is an illustrative example of a masking process.

Accordingly, the random number generating system 10 can produce a set of raw quantum random numbers 5 after each image capture period or frame (or readout operation) of the CMOS camera sensor, with each set of raw quantum random numbers 5 comprising a number of random numbers corresponding to the values in the first set of values, which may be less than the total number of image pixels of the CMOS camera sensor. The set of raw quantum random numbers 5 may be read out serially or in parallel. The set of raw quantum random numbers 5 may be treated as a matrix of random numbers with matrix positions based on the consecutive pixel values above the threshold. For example, FIG. 6 illustrates a masking process according to this aspect of the disclosure in which raw quantum random numbers 5, which are above a threshold value, are selected. In particular, FIG. 6 illustrates the construction of a matrix of raw quantum random numbers 5 from an array of values corresponding, for example, to the cumulative energy received by each photon detector element 4 in an array of photon detector elements 3 operating according to electron current mode. Alternatively, array of values may correspond to the number of photons received by each photon detector element 4 in an array of photon detector elements 3 that are operating according to electron number mode. In FIG. 6, a value of "0" indicates a "dark" pixel—i.e. a pixel corresponding to a photon detector element in which no photons were detected—while values above "0" correspond to energy being received from one or more incident photons 2. In the embodiment shown in FIG. 6, the threshold is taken to be "5", and so each value greater than 5 is used to form the set of raw quantum random numbers 5. However, it will be appreciated that, in this case, the threshold could be set to be any value above zero and below 10. For a different use case, for example, if the initial calibration was such that a value of 5 could be resolved as a non "dark" pixel (i.e. one or more photons were detected), the threshold could be set to a value above zero and below 5. As would be clear to the skilled person, the threshold can be set as appropriate for a given use case.

As is explained above, the raw quantum random numbers 5 contain quantum noise.

In the illustrated example the raw quantum random numbers 5 are subjected to post-processing to generate uniform quantum random numbers having one bit of quantum noise per bit.

The raw quantum random numbers 5 output from the random number generating system 10 are quantum random numbers containing quantum noise. However, because the raw quantum random numbers 5 have been generated based on the random number of photons and/or the total cumulative energy received at different photon detector elements 4, these raw quantum random numbers will be distributed about a mean value, with the distance of each raw quantum random number value from the mean value being determined by random noise. This mean value may be regarded as a bias in the raw quantum number values, with the value of the bias being determined by the operating parameters of the random number generating system.

The light source 1 and the photon detector elements 4 may be configured to operate in the non-linear regime. As discussed above, this occurs, for example, when some of the detector elements receive no photons, while others receive a number of photons, in a pre-set period of time. In such a regime, the variance in the number of photons received by each photon detector element of the array in the pre-set period of time is greater than the mean number of photons received by the photon detector elements of the array (i.e. the sum of all received photons divided by the number of detector elements in the array) in the pre-set period of time. This, in turn, means that the variance in the number of photoelectrons generated by the detector elements may be greater than the mean number of photoelectrons generated by the detector elements. For example, the photon detector elements 4 may be configured such that the variance in the generated values corresponding to the cumulative energy of any incident photons received by the one or more photon detector elements is greater than the mean of the generated values corresponding to the cumulative energy of any incident photons received by the one or more photon detector elements. In this case, the raw quantum random numbers 5 have a Fano factor of greater than one. This may be achieved by adjusting any one or more of the pre-set period of time, the intensity of the at least one light source 1 and the gain of the plurality of photon detector elements 4. In particular, by having a high intensity light source, with a short pre-set period of time, the system may operate in the low flux regime, and in the non-linear regime. The particular settings necessary for operating in the non-linear regime may vary depending on the particular use case and may be determined by a calibration step prior to operation as would be apparent to one skilled in the art. For example, this can be performed by adjusting the settings until, for each photon detector element, the variance in the number of received photons across time is greater than the mean number across the same time period. This is determined by measuring the number of photoelectrons being generated and determining whether the variance in the number of photoelectrons being generated by the photon detector element across time is greater than the mean number of photoelectrons being generated by the photon detector element across the same time period. In electron number mode, measuring photoelectron number is a matter of measuring voltage values with appropriate system settings. In electron current mode, measuring photoelectron number may be achieved by filtering the light into narrow wavelength bands such that the measured voltage value corresponds to photoelectron number. The system is then calibrated in each band such that the variance in the measured photoelectron numbers in each band is greater than the mean of the photoelectron numbers of the band across time. This is performed for each wavelength band across the range of wavelengths in which the system operates. This ensures the system is calibrated to operate in the non-linear regime across the range of wavelengths received by the elements during normal operation (e.g. when using a white light source).

Prior systems and methods for generating quantum random numbers have been unable to operate in the non-linear regime, because the values generated are not dependent enough on quantum effects—there is a large amount of technical noise. Therefore, any resultant numbers will not be suitably random, instead being biased and correlated due to the technical noise. However, embodiments according to this aspect of this disclosure, by using only values above a threshold to generate quantum random numbers, is able to overcome these limitations. The systems described herein are able to operate in the non-linear regime, and hence operate with a very short pre-set period of time—e.g. shutter speeds—relative to previous, known systems. As discussed below, this enables the low latency generation of output quantum random numbers from raw quantum numbers, which are themselves generated by the above described system.

A quantum random number generating system is now described according to a second embodiment of the present aspect.

An overview of the quantum random number generating system according to the second embodiment of this aspect is that the system operates in a similar manner to the first embodiment of this aspect. The set-up is also similar to the second embodiment described in relation to the first aspect of the disclosure. The light source is a single white LED light source. However, as discussed above, any other monochromatic or non-monochromatic suitable light source, whether infrared, ultraviolet, etc., may be used. Alternatively, the system may comprise multiple light sources that may be a suitable combination of any of these types of light sources. Further, the post processing of the raw quantum random numbers is the same as described below. This post processing is performed in a post-processing block, which may be implemented in hardware such as processor—e.g. a mini PC like a Raspberry Pi—or in software.

The second embodiment utilises a Chameleon 3 CM3-U3-50S5C camera with a Sony IMX264 CMOS sensor. Furthermore, an ED1-S50-MD optical diffuser is also used. The optical diffuser is placed between the light source and the sensor. The optical diffuser helps to ensure even illumination of the sensor. The brightness setting of the camera is set to 0, while the white balance (for red and blue) were set to 512. These values were chosen to avoid software modification of the raw image—i.e. so that data representing the original image detected by the detector is retained for quantum random number generation and not modified by built in software processing of the camera, for example. It will be appreciated that the particular values needed for different settings to avoid software modification of the raw image will be dependent upon the hardware and software used, and in some cases, avoiding software modification may not be necessary. The bit depth of the camera is 12 bits, and so the data is saved in the Raw-16 format (which can store up to 16 bits per pixel). The shutter speed is set to 95 μs, and the gain is set to 17. Having a high gain means that for a given intensity of light source, a higher dispersion of data can be reached, which means that there is more entropy in the data.

According to a third embodiment of the present aspect, the photon detector elements are incorporated into a digital camera. This set up is similar to the third embodiment described in relation to the first aspect of the disclosure. That is, the pixels of the digital camera correspond to the photon detecting elements, while the sensor of the digital camera corresponds to the array. The digital camera may, for example, be the digital camera of a mobile computing device, such as mobile phone or smartphone.

In this embodiment, the pre-set period of time may be determined by the shutter speed of the camera. The pre-set period of time may correspond to a frame or image captured by the camera. In some examples this frame, image or pre-set period of time may be part of a sequence, such as a video sequence. In some examples a series of frames, images or pre-set period of times may be used to generate a series of sets of quantum random numbers from a sequence, such as a video sequence.

The light source may be the flash of the camera. In the case of the camera being incorporated into a mobile computing device, the light source 1 may be the flash of the mobile computing device. If a crop is taken, as discussed in relation to the first embodiment, this may involve taking a crop of the image captured by the digital camera, and only using values that correspond to pixels within the cropped area.

In examples where the array is a camera sensor of a camera and the light source is a flash of the camera, the intensity of the flash may be controlled by the camera settings.

Post-Processing

In many applications for random numbers, such as some cryptographic functions, it is desirable, or essential, to have random numbers which are unbiased, and evenly distributed across a range of values. Further, in some applications it may be desirable, or essential, to have random numbers which have an entropy of 1. Further, it may be desirable, or essential, to have random numbers with a specific bit length, which may not be the same as the bit length of the raw random numbers 5.

Figure 7:
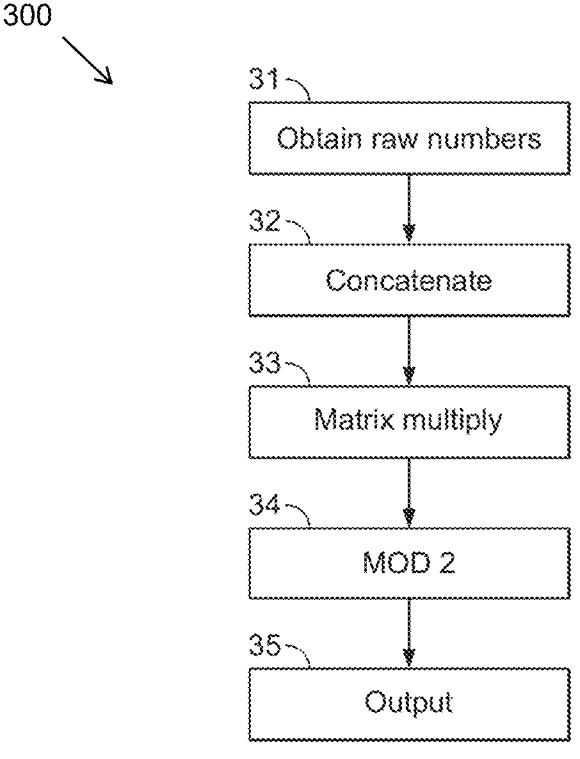
FIG. 7 is a flow chart illustrating a post-processing process for converting raw quantum random numbers into output quantum random numbers.

In a post-processing method 300, shown in FIG. 7, first the raw quantum random numbers 5 are obtained in a block 31. In the illustrated embodiment the post-processing system obtains the raw quantum random numbers 5 by extracting them from the buffer memory. Each of the raw quantum random numbers 5 has a digital length of a predetermined number of bits. Where the random number generating system 10 comprises a CMOS camera sensor, this digital length is the pixel depth of each of the camera pixels, for example 8 bits.

The raw quantum random numbers 5 are then converted to a desired bit length by concatenating groups of the raw random numbers to form intermediate random numbers having the desired bit length in a block 32.

In one illustrative example where the raw quantum random numbers 5 have a bit length of 8 and the desired bit length of the intermediate random numbers was 24 bits it would be necessary to concatenate 3 raw quantum random numbers 5 to produce each intermediate random number, because 24/8=3. In this example, where three raw quantum random numbers 5 with respective values of 15 (binary 00001111), 911 (binary 11010011) and 33 (binary (00111111) were concatenated the resulting intermediate 24-bit random number would be binary 000011111101001100111111.

In another example where the raw quantum random numbers 5 have a bit length of 8 and the desired bit length of the concatenated random numbers was 1584 bits it would be necessary to concatenate 198 raw quantum random numbers 5 to produce each intermediate random number, because 1584/8=198.

The intermediate random numbers are then each subject to a matrix-vector multiplication process in a block 33. In this matrix-vector multiplication process the bit string X of each intermediate random number is subject to a matrix vector multiplication with a matrix M of random bits to produce an output string Y, where:

$$Y_i = \sum_{j=1}^{n} M_{ij} X_j \quad (1)$$

The matrix M of random bits may be obtained from a memory associated with the post-processing system, which may be used to store a number of suitable matrices. Such matrices of random bits can be readily calculated by known methods.

Each output string Y is then subject to a modulo 2 process to form a string Ymod2 in a block 34.

Each string Ymod2 is then output by the post-processing system as an output quantum random number in a block 35. The output quantum numbers may be supplied to a memory and stored for subsequent use.

The matrix M of random bits has equal numbers of one and zero values randomly distributed across the matrix, and as a result, the matrix-vector multiplication with the matrix M of random numbers and modulo 2 process produce output quantum random numbers which are evenly distributed, and specifically are not distributed about the mean value of the Poisson distribution.

Figure 8:
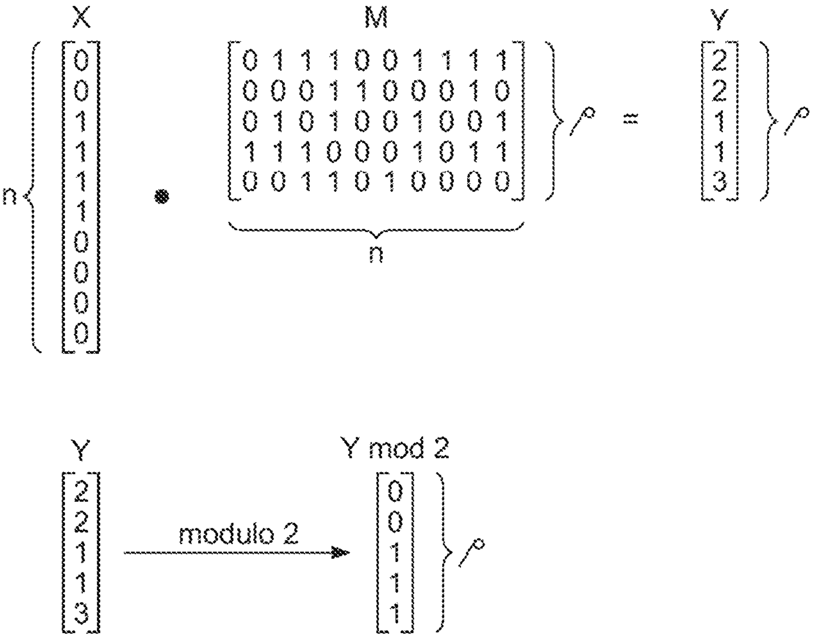
FIG. 8 is an illustrative example of a matrix vector multiplication process used during the post processing of raw quantum random numbers.

The matrix-vector multiplication and modulo 2 processes of blocks 33 and 34 are shown in FIG. 8.

Where the output quantum random numbers each have a bit length of p, the output string Y of the matrix-vector multiplication process and the string Ymod2 output by the modulo 2 process will both have this same bit length p. Accordingly, where the intermediate random numbers have a bit length of n, the matrix M of random bits must be a p by n matrix. This relationship is shown in FIG. 8.

In the illustrated example of FIG. 8 the p by n matrix M is a matrix having p rows by n columns and the intermediate random numbers are each arranged in a vector of n rows and 1 column, so that the output string Y has p rows and 1 column. In an alternative example the output string Y can be obtained by changing the order of the different factors, for example, the p by n matrix M is a matrix having n rows by p columns and the intermediate random numbers are each arranged in a vector of n columns and 1 row, so that the output string Y has p columns and 1 row.

If the raw quantum random numbers have an entropy per bit value E, in order for the output quantum random numbers to contain purely quantum noise the relationship between p and n must be that p/n=E.

In any specific implementation of the random number generating system 10 the entropy per bit value E corresponding to each set of possible suitable operating parameters of the array 3 can be calculated or determined by experimentation and stored. These values may conveniently be stored in a memory, for example in the form of a look-up table or tables.

Accordingly, when it is desired to produce output quantum random numbers having a particular bit length, for example where this bit length is required by a function using quantum random numbers, such as a security application, the system will know that this required bit length of the quantum random numbers to be produced is the required value of p.

The system can determine from the current or intended operating parameters of the array 3 what the entropy per bit value E of the raw random numbers 5 will be. The value of n which will be required in order to satisfy the relationship p/n=E can then be readily calculated.

Once the required value of n has been calculated, the required dimensions of the p by n matrix M, and the required degree of concatenation in order to convert the raw random numbers into the intermediate random numbers, can be determined. A suitable p by n matrix M can then be obtained.

As a result, the produced output quantum random numbers can be arranged to be wholly quantum random numbers with an entropy per bit of 1, or as close to 1 as possible based upon the statistical significance of the sample size, in addition to being unbiased and evenly distributed.

It will be understood that the values of p and n must be integer values so that it may not be possible to precisely satisfy the relationship p/n=E for some values of E. In such cases, since the value of p is generally fixed by the desired bit length of the output quantum random numbers, it may be preferred to select the value of n to be the lowest (integer) value of n for which p/n<E.

Once the required value of n has been calculated, the required dimensions of the p by n matrix M and the required degree of concatenation in order to convert the raw random numbers into the intermediate random numbers can be determined. A suitable p by n matrix M can then be obtained.

As a result, the produced output quantum random numbers can be arranged to be wholly quantum random numbers with an entropy per bit of 1, in addition to being unbiased and evenly distributed.

Further, in examples where n must be an integer multiple of the bit length of the raw random numbers in order to allow the intermediate numbers to be formed by concatenation, it may be preferred to select the value of n to be the lowest value of n satisfying this integer multiple requirement for which p/n<E.

In general, it is necessary that p/n<E in order for the output quantum random numbers to have an entropy per bit of 1. Having p/n as near as possible to equalling E, for example by selecting n to be as low as possible, will produce the maximum output of output quantum random numbers from each set of raw random numbers.

The use of a buffer memory is not essential. However, providing a buffer memory to receive the set of raw random numbers output from the random number generator 10, and then carrying out the post-processing on the random numbers stored in the buffer memory may simplify the post-processing.

In the example described above the raw random numbers are concatenated to form the intermediate random numbers. In other examples alternative or additional processes may be used to convert a number of raw random numbers into intermediate random numbers.

Further Examples and Embodiments of the Present Disclosure

This section discusses further examples and embodiments that may be applicable to either the first or second aspect of the present disclosure.

In some examples further optical components may be present to direct and control the light for uniform illumination of the array 3. In some examples the further optical components may include one or more attenuators and/or one or more spectral filters and/or one or more diffusers. The use of attenuators and/or spectral filters and/or diffusers may assist in matching the emission characteristics of a light source to the desired illumination of an array. In some examples such further optical components may include light guides, mirrors, lenses, prisms and diffusers. This list is not intended to be exhaustive.

In the embodiments described herein the whole of the array of sensor elements, or all pixels of the CMOS camera sensor, are uniformly illuminated and all of these sensor elements or pixels are used to populate the first set of values and to subsequently generate quantum random numbers. In some alternative examples only a part or parts of the array, or some of the pixels, are uniformly illuminated. In such examples only the outputs from the uniformly illuminated sensor elements or pixels should be used as quantum random numbers. In a CMOS camera sensor the outputs from the pixels which are not uniformly illuminated can be excluded by gating or other straightforward selection methods. For example, a crop of the resultant image may be taken. Similarly, any pixels known to be faulty may be excluded by gating or other straightforward selection methods.

For example, in some embodiments a crop may be taken of the array, so that only a subset of the photon detector elements in the array are utilised. In this case, a set of generated values may be selected corresponding to a specific set of the photon detector elements of the array, and then a first set of values corresponding to those photon detector elements that received a cumulative energy from incident photons above a threshold may be selected from this set. In particular, the crop may select a central region of the display.

It will be understood that not using some of the sensor elements or pixels reduces the output of the quantum random number generator in so far as this reduces the number of raw quantum random numbers produced by each pre-set period of time or frame (or sensor readout operation), as discussed in relation to selecting values above a threshold. However, in some examples it may not be convenient to uniformly illuminate the whole of the array or camera sensor, for example for geometric reasons. Further, in some examples it may be preferred to use only a part of the available array or camera sensor so that only a required number of quantum random numbers produced by each pre-set period of time or frame/readout operation, in order to avoid unnecessarily expending processing, and other, resources in generating extra quantum random numbers which are not required. In other embodiments, a quantum random number generator arrangement that comprises a single photon detector element may be provided.

It will be understood that the specific parameters of the system, such as the threshold, the pre-set period of time, and the intensity of the light will depend upon the specific use case of the system. Appropriate values will vary on a case by case basis, and will be apparent to the skilled person for a given scenario. Furthermore, it will be understood that while a shorter pre-set period of time may result in quantum random numbers being generated more quickly, it may also use more power. Therefore, power usage may be balanced against other requirements, such as speed of quantum random number generation, when setting the parameters.

The embodiments described above use a light source with a controlled intensity where the light flux emitted by the light source can be controlled. In other examples the intensity and/or light flux of the light source may not be controlled. In some examples it may not be viable to control the intensity of the light source. In such examples the operating parameters of the array may be set based upon the intensity of the light source in order to give a certain likelihood that a given number of quantum random numbers will be produced. The operating parameters of the array may be based upon an already know intensity of the light source, or upon a measurement of the intensity of the light source.

In some embodiments, where the array is a colour sensor, such as a CMOS colour camera sensor, having different sensor elements responsive to different colours of incident light only sensor elements responsive to one or more specific colours may be selectively used to generate quantum random numbers.

Embodiments described above generate a set of quantum random numbers from a single exposure period of the sensor array. Where the array is a camera sensor the exposure period may be a frame or image captured by the camera. In some examples this frame, image or exposure period may be part of a sequence, such as a video sequence. In some examples a series of frames, images or exposure periods may be used to generate a series of sets of quantum random numbers from a sequence, such as a video.

In the embodiments described above the matrix M of random bits is obtained from a memory. In other examples the matrix M of random bits may be obtained by calculating a new matrix each time the matrix vector multiplication is to be carried out. In some examples, one or more stored matrices M may be used repeatedly.

The embodiments described above use binary bits to encode the quantum random numbers. In other examples an alternative encoding basis may be used. In some examples the encoding may be changed from binary bits to another encoding during the generation of the quantum random numbers. In some examples where an alternative encoding is used before the modulo 2 operation is carried out, the modulo 2 operation may be replaced by an alternative operation matched to the alternative encoding or the same encoding.

In the illustrated embodiments some components may be integrated at a circuit, package or die level.

In the illustrated embodiments of the invention the quantum random number generating system may comprise a computing and/or electronic device.

Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The first aspect of the disclosure will now be further described in the following first set of numbered clauses:

1. A system for generating random numbers comprising:
   at least one source of non-monochromatic radiation;
   one or more photon detector elements, each for converting received photons of the non-monochromatic radiation into a corresponding voltage value;
   wherein the at least one source of non-monochromatic radiation is configured to illuminate the one or more photon detector elements such that non-monochromatic radiation from the at least one radiation source is incident on each of the one or more photon detector elements, whereby the non-monochromatic radiation is incident on random ones of the one or more photon detector element; and
   means of converting voltage values generated from the incident non-monochromatic radiation by the one or more photon detector elements to random numbers each comprising quantum noise.
2. The system according to clause 1, wherein the system is configured such that the non-monochromatic radiation from the at least one radiation source is incident directly on each of the one or more photon detector elements without passing through a filter.
3. The system according to any of clauses 1 or 2, wherein each of the one or more photon detector element produces a separate random number comprising quantum noise.
4. The system according to any of clauses 1 to 3, wherein the at least one source of non-monochromatic radiation is a white light source.
5. The system according to any of clauses 1 to 4, wherein the at least one source of non-monochromatic radiation is configured relative to the one or more photon detector elements such that each of the one or more photon detector elements are illuminated with non-monochromatic radiation during a single exposure period.
6. The system according to any of clauses 1 to 5, wherein the at least one source of non-monochromatic radiation and the one or more photon detector elements are arranged such that the one or more photon detector elements respond linearly to the received radiation.
7. The system according to any of clauses 1 to 6, wherein the one or more photon detector elements are comprised in an array.
8. The system according to clause 7, wherein the one or more photon detector elements are all of the photon detector elements comprised in the array.
9. The system according to clause 7, wherein the one or more photon detector elements are a sub-set of the photon detector elements comprised in the array.
10. The system according to any preceding clause, wherein the at least one radiation source comprises one or more LEDs.
11. The system according to any one of clauses 7 to 10, wherein the array is a CMOS sensor or a CCD sensor.
12. The system according to any one of clauses 7 to 11, wherein the array is a camera sensor, and the at least one source of non-monochromatic radiation and the exposure time and ISO of the camera sensor are arranged such that the one or more photon detector elements respond linearly to received radiation.
13. The system according to clause 12, wherein the camera sensor is a camera of a mobile computing device.
14. The system according to clause 12, wherein the at least one source of non-monochromatic radiation is a flash of the mobile computing device.
15. The system according to clause 13 or clause 14, wherein the mobile computing device is a smartphone.
16. A method of generating random numbers comprising:
   emitting photons from at least one source of non-monochromatic radiation such that non-monochromatic radiation from the at least one source of non-monochromatic radiation is incident on each of one or more of photon detector elements, each for converting received photons of the non-monochromatic radiation into a corresponding voltage value, whereby the non-monochromatic radiation is incident on random ones of the one or more photon detector element;
   converting the received non-monochromatic light at each of the one or more photon detector elements into a corresponding voltage value; and
   converting voltage values of the one or more photon detector elements to random numbers each comprising quantum noise.
17. The method according to clause 16, wherein each of the one or more photon detector elements produces a separate random number comprising quantum noise.

18. The method according to any of clauses 16 or 17, wherein the at least one source of non-monochromatic radiation is a white light source.
19. The method according to any of clauses 16 to 18, wherein the at least one source of non-monochromatic radiation is configured relative to the one or more photon detector elements such that each of the one or more photon detector elements are illuminated with non-monochromatic radiation during a single exposure period.
20. The method according to any of clauses 16 to 19, wherein the at least one source of non-monochromatic radiation and the one or more photon detector elements are arranged such that the one or more photon detector elements respond linearly to the received radiation.
21. The method according to any of clauses 16 to 21, wherein the one or more photon detector elements are comprised in an array.
22. The method according to clause 21, wherein the one or more photon detector elements are all of the photon detector elements comprised in the array.
23. The method according to clause 21, wherein the one or more photon detector elements are a sub-set of the photon detector elements comprised in the array.
24. The method according to any one of clauses 16 to 23, wherein the at least one source of non-monochromatic radiation comprises one or more LEDs.
25. The system according to any one of clauses 16 to 23, wherein the array is a CMOS sensor or a CCD sensor.
26. The method according to any one of clauses 16 to 23, wherein the array is a camera sensor, and the method further comprises arranging the at least one source of non-monochromatic radiation and the exposure time and ISO of the camera sensor such that the one or more photon detector elements respond linearly to received radiation.
27. The method according to clause 26, wherein the camera sensor is a camera of a mobile computing device.
28. The method according to clause 26, wherein the at least one source of non-monochromatic radiation is a flash of the mobile computing device.
29. The method according to clause 27 or clause 28, wherein the mobile computing device is a smartphone.

The second aspect of the disclosure will now be further described in the following second set of numbered clauses:

CLAUSE

1. A system for generating random numbers comprising: at least one light source for emitting photons;
   one or more photon detector elements, wherein each of the one or more photon detector elements are configured to receive incident photons, wherein the at least one light source is configured to illuminate the one or more photon detector elements, whereby photons from the at least one light source are incident at random on the one or more photon detector elements;
   means for generating a value for each of the one or more photon detector elements, each value corresponding to the cumulative energy of any incident photons received by the respective photon detector element within a pre-set period of time;
   means for selecting a first set of values comprising each of the values that are above a threshold value; and
   means for converting each value in the set of values into a random number comprising quantum noise.
2. The system of clause 1, wherein the generated value corresponding to the cumulative energy of any incident photons received by the one or more photon detector elements within a pre-set period of time is a digital value.
3. The system of any of clauses 1 or 2, wherein the one or more photon detector elements are configured to generate a voltage value corresponding to the cumulative energy of any incident photons received by the one or more photon detector elements within a pre-set period of time.
4. The system of clause 3, wherein the means for generating a value corresponding to the cumulative energy of any incident photons received by the one or more photon detector elements within a pre-set period of time is configured to convert the voltage values generated by the one or more photon detector elements into digital values;
   wherein the means for selecting a first set of values is configured to select a first set of digital values comprising each of the digital values that are above a threshold value; and
   wherein the means for converting each value in the set of values into a random number is configured to convert each digital value in the set of digital values into a random number comprising quantum noise.
5. The system of any of the above clauses, wherein the one or more photon detector elements comprises a plurality of photon detector elements.
6. The system of clause 5, wherein the at least one light source and the plurality of photon detector elements are configured such that the variance in the generated values corresponding to the cumulative energy of any incident photons received by the one or more photon detector elements is greater than the mean of the generated values corresponding to the cumulative energy of any incident photons received by the one or more photon detector elements.
7. The system of clause 6, wherein the at least one light source and the plurality of photon detector elements are configured such that the variance in the generated values corresponding to the cumulative energy of any incident photons received by the one or more photon detector elements is greater than the mean of the generated values corresponding to the cumulative energy of any incident photons received by the one or more photon detector elements by adjusting any one or more of the pre-set period of time, the intensity of the at least one light source, and the gain of the plurality of photon detector elements.
8. The system of clause 7, wherein the pre-set period of time is less than or equal to 95 μs.
9. The system of any of clauses 5 to 8, wherein the plurality of photon detector elements are arranged in an array of photon detector elements.
10. The system of clause 9, wherein the system also comprises a means for selecting a second set of values comprising each of the values that correspond to a specific set of the plurality of photon detector elements, and wherein the means for selecting a first set of values is configured to select a first set of values from the second set of values, wherein the first set of values comprises each of the values in the second set of values that are above a threshold value.

11. The system of clause 10, wherein the specific set of the plurality of photon detector elements comprises the central photon detector elements of the array of photon detector elements.
12. The system of any of the above clauses, wherein the one or more photon detector elements are either a CCD sensor or a CMOS sensor.
13. The system of any of the above clauses, wherein the one or more photon detector elements are incorporated into a digital camera.
14. The system of clause 13, wherein the pre-set period of time is determined by the shutter speed of the camera.
15. The system of either of clauses 13 or 14 when dependent upon clause 10, wherein the means for selecting a second set of values comprising each of the values that correspond to a specific set of the plurality of photon detector elements comprises a means for cropping the image captured by the camera.
16. The system of any of clauses 5 to 15, wherein each of the plurality of photon detector elements produces a separate random number comprising quantum noise.
17. The system of any of the above clauses, wherein the at least one light source is monochromatic.
18. The system of any of clauses 1 to 16, wherein the at least one light source is non-monochromatic.
19. The system of clause 18, wherein the at least one light source is a white light source.
20. The system of any of the above clauses, wherein the at least one light source is an LED.
21. The system of clause 13, or of any of clauses 14 to 20 when dependent upon clause 15, wherein the digital camera is a digital camera of a mobile computing device.
22. The system of clause 21, wherein the at least one light source is a flash of the mobile computing device.
23. The system of clause 21 or 22, wherein the mobile computing device is a smartphone.
24. The system of any of the above clauses, wherein the system further comprises an optical diffuser between the one or more light sources and the one or more photon detector elements.
25. A method of generating random numbers comprising:
  emitting, by at least one light source, photons such that one or more photon detector elements are illuminated;
  receiving, by the one or more photon detector elements, incident photons, wherein photons from the at least one light source are incident at random on the one or more photon detector elements;
  generating a value corresponding to the cumulative energy of any incident photons received by the one or more photon detector elements within a pre-set period of time;
  selecting a first set of values comprising each of the values that are above a threshold value; and
  converting each value in the set of values into a random number comprising quantum noise.
26. The method of clause 25, wherein the generated value corresponding to the cumulative energy of any incident photons received by the one or more photon detector elements within a pre-set period of time is a digital value.
27. The method of any of clauses 25 or 26, further comprising the step of generating, by the one or more photon detector elements, a voltage value corresponding to the cumulative energy of any incident photons received by the one or more photon detector elements within a pre-set period of time.
28. The method of clause 27, wherein the step of generating a value corresponding to the cumulative energy of any incident photons received by the one or more photon detector elements within a pre-set period of time comprises converting the voltage values generated by the one or more photon detector elements into digital values;
  wherein the step of selecting a first set of values comprises selecting a first set of values comprising each of the digital values that are above a threshold value; and
  wherein the step of converting each value in the set of values into a random number comprises converting each digital value in the set of values into a random number comprising quantum noise.
29. The method of any of clauses 25 to 28, wherein the one or more photon detector elements that receive the incident photons comprises a plurality of photon detector elements.
30. The method of clause 29, wherein the at least one light source and the plurality of photon detector elements are configured such that the variance in the generated values corresponding to the cumulative energy of any incident photons received by the one or more photon detector elements is greater than the mean of the generated values corresponding to the cumulative energy of any incident photons received by the one or more photon detector elements.
31. The method of clause 30, wherein the at least one light source and the plurality of photon detector elements are configured such that the variance in the generated values corresponding to the cumulative energy of any incident photons received by the one or more photon detector elements is greater than the mean of the generated values corresponding to the cumulative energy of any incident photons received by the one or more photon detector elements by adjusting any one or more of the pre-set period of time, the intensity of the at least one light source, and the gain of the plurality of photon detector elements.
32. The method of clause 31, wherein the pre-set period of time is less than or equal to 95 μs.
33. The method of any of clauses 29 to 32, wherein the plurality of photon detector elements are arranged in an array of photon detector elements.
34. The method of clause 33, wherein the method further comprises the step of:
  selecting a second set of values comprising each of the values that correspond to a specific set of the plurality of photon detector elements; and wherein the first set of values is selected from the second set of values.
35. The method of clause 34, wherein the specific set of the plurality of photon detector elements comprises the central photon detector elements of the array of photon detector elements.
36. The method of any of clauses 25 to 35, wherein the one or more photon detector elements are either a CCD sensor or a CMOS sensor.
37. The method of any of clauses 25 to 36, wherein the one or more photon detector elements are incorporated into a digital camera.
38. The method of clause 37, wherein the pre-set period of time is determined by the shutter speed of the camera.

39. The method of either of clauses 37 or 38 when dependent upon clause 34, wherein the means for selecting a second set of values comprising each of the values that correspond to a specific set of the plurality of photon detector elements comprises a means for cropping the image captured by the camera.
40. The method of any of clauses 29 to 39, wherein each of the plurality of photon detector elements produces a separate random number comprising quantum noise.
41. The method of any of clauses 25 to 40, wherein the at least one light source is monochromatic.
42. The method of any of clauses 25 to 40, wherein the at least one light source is non-monochromatic.
43. The method of clause 42, wherein the at least one light source is a white light source.
44. The method of any of clauses 25 to 43, wherein the at least one light source is an LED.
45. The method of clause 37, or of any of clauses 38 to 44 when dependent upon clause 37, wherein the digital camera is a digital camera of a mobile computing device.
46. The method of clause 45, wherein the at least one light source is a flash of the mobile computing device.
47. The method of either clause 45 or 46, wherein the mobile computing device is a smartphone.
48. The method of any of clauses 25 to 47, wherein photons incident on the one or more photon detector elements pass through an optical diffuser between the one or more light sources and the one or more photon detector elements.
49. A computer program that, when executed, causes the system of any of clauses 1 to 24 to carry out the method of any of clauses 25 to 48.
50. A computer-readable medium having stored thereon the computer program of clause 49.

The invention claimed is:

1. A system for generating random numbers comprising:
at least one source of non-monochromatic radiation;
one or more photon detector elements, each for converting received photons of the non-monochromatic radiation into a corresponding output value;
wherein the at least one source of the non-monochromatic radiation is configured to illuminate the one or more photon detector elements such that the non-monochromatic radiation from the at least one source of the non-monochromatic radiation is incident on each of the one or more photon detector elements, whereby the non-monochromatic radiation is incident on random ones of the one or more photon detector elements; and
a converter for converting output values generated from the incident non-monochromatic radiation by the one or more photon detector elements to random numbers each comprising quantum noise;
wherein the one or more photon detector elements are configured such that each output value corresponds to a cumulative energy of the photons received by the respective photon detector element of the one or more photon detector elements within a pre-set period of time.

2. The system according to claim 1, wherein the non-monochromatic radiation comprises photons having a range of different wavelengths, wherein the system is configured such that photons of multiple different wavelengths are received by each photon detector element from the at least one source of the non-monochromatic radiation.

3. The system according to claim 1, wherein the system is configured such that the non-monochromatic radiation from the at least one source of the non-monochromatic radiation is incident directly on each of the one or more photon detector elements without passing through a filter.

4. The system according to claim 1, wherein each of the one or more photon detector elements produces a separate random number comprising quantum noise.

5. The system according to claim 1, wherein the at least one source of non-monochromatic radiation is a white light source.

6. The system according to claim 1, wherein the at least one source of non-monochromatic radiation is configured relative to the one or more photon detector elements such that each of the one or more photon detector elements are illuminated with the non-monochromatic radiation during a single exposure period of the one or more photon detector elements.

7. The system according to claim 1, wherein the at least one source of non-monochromatic radiation and the one or more photon detector elements are arranged such that the one or more photon detector elements respond linearly to the received photons of the non-monochromatic radiation.

8. The system according to claim 1, wherein the system is configured so as to not count the received photons.

9. The system according to claim 1, wherein the converter comprises an analog-to-digital converter for converting the generated output values into digital values, the digital values being used to generate the random numbers.

10. The system according to claim 1, wherein the converter is configured to perform a mapping in which the cumulative energy of the photons received by the respective photon detector element of the one or more photon detector elements is mapped to a random number comprising quantum noise.

11. A method of generating random numbers comprising:
emitting photons from at least one source of non-monochromatic radiation such that the non-monochromatic radiation from the at least one source of non-monochromatic radiation is incident on each of one or more photon detector elements, each for converting received photons of the non-monochromatic radiation into a corresponding output value, whereby the non-monochromatic radiation is incident on random ones of the one or more photon detector elements;
converting the received photons of the non-monochromatic radiation at each of the one or more photon detector elements into a corresponding output value; and
converting output values of the one or more photon detector elements to random numbers each comprising quantum noise;
wherein each output value corresponds to a cumulative energy of the photons received by a respective photon detector element of the one or more photon detector elements within a pre-set period of time.

12. The method according to claim 11, wherein the non-monochromatic radiation comprises photons having a range of different wavelengths, wherein multiple different wavelengths are received by each photon detector element from the at least one source of the non-monochromatic radiation.

13. The method according to claim 11, further comprising not counting the received photons.

14. The method according to claim 11, further comprising converting the output values into digital values, the digital values being used to generate the random numbers.

15. The method according to claim 11, further comprising performing a mapping in which the cumulative energy of the photons received by the respective photon detector element of the one or more photon detector elements is mapped to a random number comprising quantum noise.

* * * * *